United States Patent
Gummerson

[11] Patent Number: 6,076,341
[45] Date of Patent: Jun. 20, 2000

[54] GROUND-ENGAGING SHOE ASSEMBLY FOR A POWER MOWER

[76] Inventor: Elwyn Gummerson, R.R.#2, Tavistock, Ontario, Canada, N0B 2R0

[21] Appl. No.: 09/022,213

[22] Filed: Feb. 10, 1998

Related U.S. Application Data

[60] Division of application No. 08/582,157, Jan. 2, 1996, Pat. No. 5,771,672, which is a continuation-in-part of application No. 08/231,132, Apr. 22, 1994, Pat. No. 5,483,789.

[51] Int. Cl.[7] .................................................. A01D 34/74
[52] U.S. Cl. ...................... 56/17.2; 56/15.5; 56/DIG. 3; 56/DIG. 10
[58] Field of Search ............... 56/15.5, 6, 17.2, 56/17.5, 14.7, 15.6, 16.3, DIG. 3, DIG. 9, DIG. 10, DIG. 22

[56] References Cited

U.S. PATENT DOCUMENTS

| | | | |
|---|---|---|---|
| 2,601,366 | 6/1952 | Chapman | 143/43 |
| 2,662,561 | 12/1953 | Duncan, Jr. | 143/43 |
| 2,699,635 | 1/1955 | Burton | 56/25 |
| 2,840,974 | 7/1958 | Dunn et al. | 56/25 |
| 2,997,835 | 8/1961 | Stewart | 56/2 |
| 3,003,299 | 10/1961 | Smith et al. | 56/25.4 |
| 3,061,996 | 11/1962 | Ripps | 56/25 |
| 3,063,226 | 11/1962 | Pfauser | 56/25.4 |
| 3,274,762 | 9/1966 | Jolls | 56/25.4 |
| 3,415,043 | 12/1968 | Shones | 56/6 |
| 3,750,377 | 8/1973 | Clark | 56/10.4 |
| 4,206,580 | 6/1980 | Truax et al. | 56/10.4 |
| 4,518,043 | 5/1985 | Anderson et al. | |
| 4,697,405 | 10/1987 | DeWitt et al. | |
| 4,747,255 | 5/1988 | Roden | |
| 4,901,508 | 2/1990 | Whatley | |
| 5,035,107 | 7/1991 | Scarborough | |
| 5,483,789 | 1/1996 | Gummerson | |

*Primary Examiner*—Terry Lee Melius
*Attorney, Agent, or Firm*—Martin J. Marcus

[57] ABSTRACT

A ground-engaging shoe assembly is provided for a power mower in which a mower blade is rotated in an upright shaft. The ground-engaging shoe includes a hub support assembly which is secured to the mower housing of the power mower. A ground-engaging shoe assembly is secured to a bearing housing which is located at the lower end of a hollow rotatable shaft, the ground-engaging shoe assembly including a bearing within which the hollow shaft rotates, whereby the ground-engaging shoe assembly is stationary. The bearing housing is adapted selectively to accept different ground-engaging shoes. An adjusting bolt extends through the hollow shaft and is secured at its lower end to the bearing housing An upper tower housing is adapted to transfer loading weight through the adjusting bolt to the bearings. The adjusting bolt is vertically-adjustably-secured at its upper end with respect to the upper tower housing by means of a locking-type nut. Thus, the cutting height of the mower blade is adjusted by loosening the locking-type nut, and by turning the adjusting bolt, e.g., by means of a slot at its upper end, thereby safely and easily adjusting the height of the mower blade by raising or lowering the ground-engaging shoe.

14 Claims, 19 Drawing Sheets

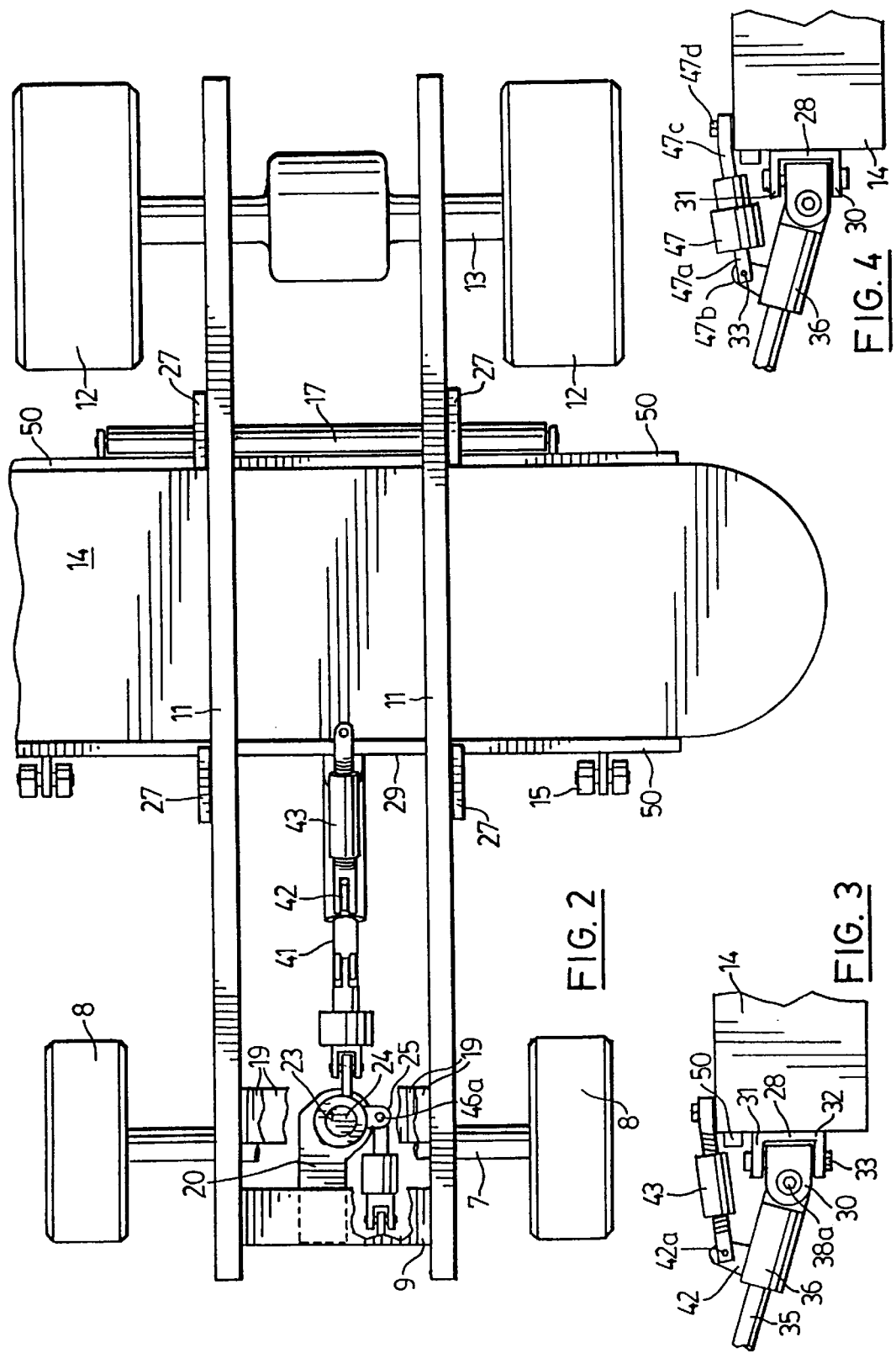

GROUND-ENGAGING SHOE ASSEMBLY FOR A POWER MOWER

1) BACKGROUND OF THE INVENTION (i) Related Invention

This application is a division of application Ser. No: 08/582,157 filed Jan. 2, 1996, now U.S. Pat. No. 5,771,672, which was a continuation-in-part application of Ser. No. 08/231,132 filed Apr. 22, 1994, now U.S. Pat. No. 5,483,789, the entire contents of which are incorporated herein by reference.

(ii) Field of the Invention

This invention relates to a ground-engaging shoe assembly for a power mower in which a mower blade is rotated in an upright shaft.

(iii) Description of the Prior Art

Grass cutting mower attachments for a vehicles are known, in which the grass cutting mower attachment being operated to move quickly laterally to the right or to the left of the vehicle and/or up or down vertically with respect to the vehicle. Up to the present time the most versatile grass cutting machines require the operator to move the complete vehicle in a series of manoeuvres around obstacles. This constant manoeuvring can be nauseating, tiring and time consuming. There are now a number of mower devices which have been adapted for mounting on vehicles and include some form of retraction and extension apparatus for moving the mowers or saws towards and away from the vehicle. Some such retractable mower devices are shown in U.S. Pat. No. 2,719,081, issued to Allen et al, U.S. Pat. No. 2,662,561, issued to Duncan, U.S. Pat. No. 2,699,635, issued to Burton, U.S. Pat. No. 2,601,366, issued to Chapman, U.S. Pat. No. 3,003,299, issued to Smith et al, U.S. Pat. No. 3,061,996 issued to Ripps, U.S. Pat. No. 3,274,762 issued to Jolls, U.S. Pat. No. 4,048,789, issued to Cartner, U.S. Pat. No. 2,997,835, issued to Stewart, U.S. Pat. No. 2,840,974 issued to Dunn et al, and U.S. Pat. No. 4,206,580 issued to Truax et al. The mowers of the patents issued to Allen, Duncan, Burton, Chapman, and Smith are equipped with mechanical retraction devices, and the mowers shown in the patents issued to Ripps, Jolls, Cartner, Stewart, Dunn, and Truax are equipped with hydraulic retraction mechanisms.

In U.S. Pat. No. 3,063,226 issued to E. M. Pfauser, a riding type rotary mower was disclosed, which had the housing of a rotary cutting unit suspended beneath the mower by means including a parallel linkage arrangement. That mower was said to be capable of traversing uneven terrain, and for this purpose, runners were provided at the edges of the housing to lift the cutter housing when a runner rode over a mound. The drive shafts to the rotary mower blades were provided with splines so that, as the housing was raised, the drive shafts telescoped. Also, the axes of the links of the parallel suspension linkage were set at an angle with the vertical of approximately 70° which permitted slight rearward movement of the cutter housing as the housing was raised. The suspension mechanism of such rotary mower structure was designed to elevate the cutter unit, but could not displace it rearwardly because the couplings and the linkage accommodated only slight rearward movement.

U.S. Pat. No. 4,518,043 patented May 21, 1985 by J. F. Anderson et al provided a retractable in-row tiller device that had a parallelogram carriage structure for supporting the outrigger arm and tiller and for retracting and extending the outrigger arm and tiller in relation to the tractor on which it was mounted. It also included an electrohydraulic control system with a single wand plant feeler device that provided automatic control to guide the tiller around plants. It also included an automatic positive depth control feature operated electro-hydraulically by a gauge wheel.

U.S. Pat. No. 4,697,405 disclosed a multi-blade cutting head supported by a tractor-towed trailer which moved along and was guided by a guard rail for mowing thereunder. Telescoping and pivoting arms, extending above and beyond the upper limit of the guard rail, supported a mowing head which was rotatable about a vertical axis when it encountered a guard rail post.

U.S. Pat. No. 3,750,377 patented Aug. 7, 1973 by J. R. Clark provided a weed cutting attachment secured to a tractor angled at approximately 45° with respect to the direction of travel, which rode beneath the surface of the soil for cutting the weeds. A plurality of these blades was equi-angularly disposed about a rotatably positionable platform. The platform was angled with respect to horizontal such that only one blade was in contact with the soil at any one position of the platform. A feeler extended forwardly of the platform to detect any trees in the path of the cutting blade. Upon detection of a tree, the feeler tripped a release mechanism, which permitted the platform to rotate due to the drag of the embedded blade. Rotation of the platform caused the then embedded blade to rotate and rise above the soil. Simultaneously, another of the cutting blades came into contact with the soil and embedded itself to resume the weed cutting function. During the rotation of the platform, the position of the tree with respect to the moving platform was such that the cutting blades passed on either side of the tree.

U.S. Pat. No. 4,747,255 patented May 31, 1988 by R. Roder provided an agricultural mower which included a parallel linkage suspension mechanism for the cutter assembly, the suspension mechanism including swing arms which, in the use position, were substantially-vertically-oriented, enabling the cutter assembly, upon striking an object, to respond by moving rearwardly relative to the forwardly travelling main frame. Then, as the pendulum action continued, the cutter assembly was elevated above the obstruction to a clearing height.

U.S. Pat. No. 4,901,508 patented Feb. 20, 1990 by D. L. Wheatly provided a mower for mowing vegetation under a fence which was supported above the surface of the earth by a series of spaced posts. The mower included a horizontal boom which was connected at one end with a prime mower and which supported a mowing head at its other end. The mowing head was pivotal about vertical and horizontal axes so that when the mowing head contacted one of the fence posts, the mowing head pivoted around the position of the post while being drawn by the prime mover in a forward direction. The mowing head was angularly tilted vertically for mowing a fence row or other surface on an incline with respect to the surface of the earth supporting the prime over.

U.S. Pat. No. 5,035,107 patented Jul. 30, 1991 by J. H. Scarborough provided a rotary lawn mower having a trimming attachment for trimming around fence posts. The trimming attachment assembly included an auxiliary trimming blade mounted in a housing and attached to a swing arm assembly, mounted on the primary mower housing. In the forward position, the trimming attachment extended outwardly from, but slightly overlapped, the mowed path of the primary mower. As a fence post adjacent the primary mower was encountered by the trimming attachment assembly, the trimming attachment assembly was pushed rearwardly by the obstruction and swung into the mowed path of the primary mower, during which process the grass near the fence post was cut. As the fence post or other object was passed, an actuator assembly forced the trimming assembly back into its original forward auxiliary cutting position.

The invention disclosed and claimed in the above-identified U.S. Pat. No. 5,483,789 provided the combination of a motor-driven vehicle having front wheels and rear wheels and a longitudinally-extending frame bed therebetween, and a transversely-mounted powered grass-cutting mower having a housing and powered grass cutting blades which was mounted to the frame bed by means of a suspending mounting system. Such mounting system included a transversely-mounted track which was pivotally-secured by a parallelogram linkage to the longitudinal chassis of the motor-driven vehicle. The track included a first powered operator for moving the transversely-mounted track, and thus the mower housing, through an infinite number of vertical locations between an upper limit and a lower limit. The track also included a roller on the mower housing which was rollingly-operatively associated with the transversely-mounted track on the mower housing, and a second powered operator for moving the mower housing by way of a linkage connected to the mower housing through an infinite number of lateral locations between a left lateral limit and a right lateral limit.

The invention disclosed and claimed in the above-identified parent application Ser. No. 08/582,157 (now U.S. Pat. No. 5,771,672 issued Jun. 30, 1998) provided the combination of a motor-driven vehicle having front wheels and rear wheels and a longitudinally-extending frame bed therebetween, a transversely-mounted powered grass-cutting mower, the mower having a housing and powered grass cutting blades, and a suspended mounting system for mounting the mower to the frame bed. The suspended mounting system included vertical guidance means which were a component of the suspended mounting system, the vertical guidance means being secured between the longitudinally-extending frame bed of the motor-driven vehicle and the mower housing. Rigid linkage means were secured between the longitudinally-extending frame bed of the motor-driven vehicle and the mower housing. A first powered operating means was connected to the linkage means for moving the mower housing in a finite number of controlled, vertically-upwardly-guided positions to a maximum upper position within the constraints of the vertical guidance means, and for moving the mower housing through a finite number of controlled, vertically-downwardly-guided positions to a minimum lower position within the constraints of the vertical guidance means, the vertical locations thereby being between an upper limit and a lower limit. Horizontal guidance means were secured to the mower housing for guiding lateral movement of the mower housing relative to the longitudinally-extending frame, the lateral movement being between a left lateral limit and a right lateral limit. A second powered operating means was operatively associated with the horizontal guidance means, for moving the mower housing, within the constraints of the horizontal guidance means, through a finite number of positivelycontrolled lateral locations between the left lateral limit and the right lateral limit.

2) DESCRIPTION OF THE INVENTION (i) Aims of the Invention

In spite of these prior patents, there is still a need for a ground-engaging shoe assembly for a power mower in which a mower blade is rotated in an upright shaft.

(ii) Statement of Invention

The present invention provides a ground-engaging shoe assembly for a mower housing for a power mower in which a mower blade is rotated or an upright shaft. The ground-engaging shoe includes a hub support assembly which is secured to the mower housing of the power mower. A bearing housing is provided which is adapted selectively to accept different ground-engaging shoes, to which the selected ground-engaging shoe is adapted to be quickly installed, exchanged and secured. A ground-engaging shoe is secured to a lower face of the bearing housing, the bearing housing including a bearing within which the hollow shaft rotates, whereby the ground-engaging shoe assembly is stationary. An adjusting bolt extends through the hollow shaft and is secured at its lower end to the bearing housing. An upper tower housing is adapted to transfer loading weight through the adjusting bolt to the bearing. The adjusting bolt is vertically-adjustably-secured at its upper end with respect to the upper tower housing whereby the adjusting bolt is vertically-adjustably-secured at its upper end with respect to the upper tower housing.

The present invention also provides the combination of a multi-bladed power mower comprising a plurality of adjacent power mowers, and a plurality of ground-engaging shoe assemblies, each such ground-engaging shoe assembly comprising a ground-engaging shoe assembly as described above.

(iii) Features of the Invention

By one feature of the ground-engaging assembly, the hub support assembly is mounted on the interior of the mower housing.

By yet another feature of the ground-engaging assembly each roll of the ground-engaging shoe assembly or assemblies includes a central upper well to accommodate the bearing housing.

By still another feature of the ground-engaging assembly, the lower surface of the ground engaging assembly comprises a low friction surface.

By still yet another feature of the ground-engaging assembly, the low friction surface is provided by means of a rotatable disk-shaped wheel with a turned-up outer perimeter.

By yet still another feature of the ground-engaging assembly, the low friction surface is provided by a rectangular frame which supports a leading roller and a trailing roller, these rollers supporting and guiding an endless, low-friction belt or track.

By still another feature of the ground-engaging assembly, the low friction surface is provided by a rectangular frame having a plurality of freely-rotatable, ground-engaging wheels.

By still a further feature of the ground-engaging shoe assembly, the low friction surface is provided with a quick connect-disconnect attachment to permit different ground-engaging shoes to be installed quickly.

By another feature of the ground-engaging shoe assembly, the adjusting bolt is secured at its lower end to the bearing housing by means of a tapered shank and a threaded lower end of the adjusting bolt which accommodates a locking-type nut.

By yet another feature of the ground-engaging shoe includes an upper collar, and the bearing housing receives the collar therein and secures the ground-engaging shoe thereto by means of bolt or screw means.

By still another feature of the adjusting bolt includes an upper threaded portion, and the adjusting bolt is secured to the upper tower housing by means of threaded engagement with a locking-type nut, whereby the cutting height of the mower blade is adjusted by loosening the locking-type nut, and by turning the adjusting bolt by means of a slot at its upper end, thereby adjusting the height of the mower blade by raising or lowering the ground-engaging shoe.

By a still further feature, the ground-engaging shoe includes a longitudinally-extending spring steering tab which is adapted to maintain the ground-engaging shoe in its proper trailing position while the power mower blade is being lowered, or when the power mower is travelling over uneven ground.

By yet a further feature of the ground-engaging shoe includes a ground-engaging endless belt entraining a forward freely-rotatable roller and a rear freely-rotatable roller, and includes a low friction lower skid plate or plates effective to reduce deflection of the endless belt while travelling over uneven ground.

3) BRIEF DESCRIPTION OF THE DRAWINGS

In the accompanying drawings,

FIG. 2 is a top plan view of the embodiment shown in FIG. 1;

FIG. 3 is an enlarged view showing one mode for providing a fixed but variable relationship between the mower housing and the suspended mounting system;

FIG. 4 is an enlarged view showing an alternative mode for providing a fixed but variable relationship between the mower housing and the suspended mounting system;

4) DESCRIPTION OF THE PREFERRED EMBODIMENTS

Figure 1:
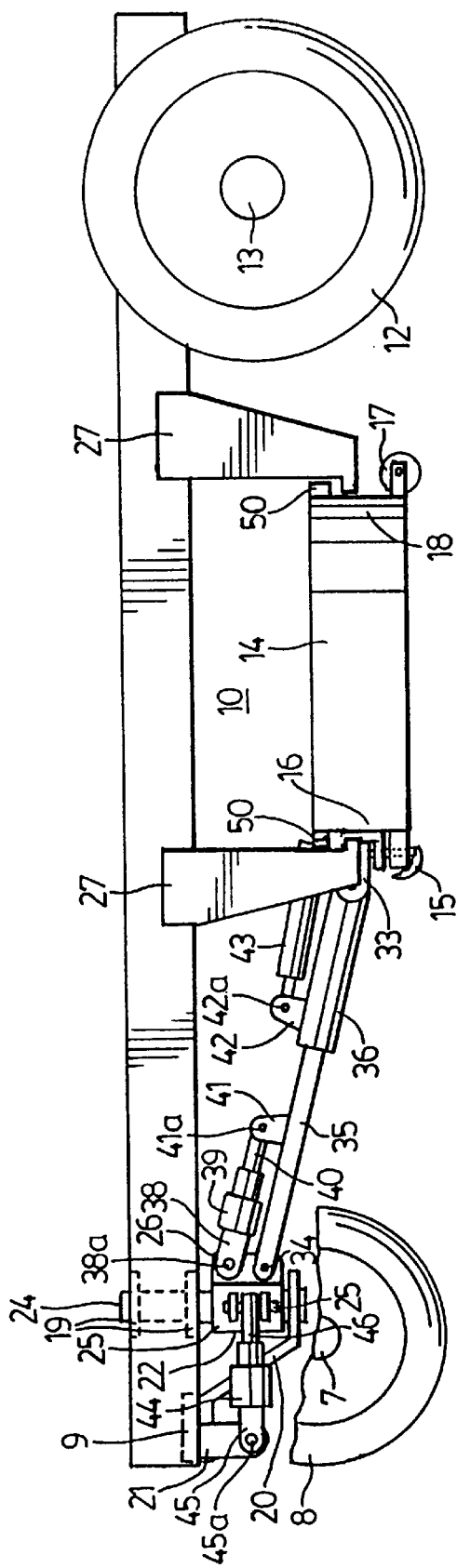
FIG. 1 is a side elevational view of a front-mounted embodiment of the suspended mounting system of the invention described and claimed in the above-identified parent application for the mower housing.

FIGS. 1 to 30 describe embodiments of the invention disclosed and claimed in the above-identified parent application.

(i) Description of FIGS. 1 to 4

Referring to FIGS. 1 to 4, the mower attachment is mounted on a conventional vehicle having a longitudinal body including longitudinally-extending rails 11, front steering wheels 8 and axle 7, rear driving wheels 12 and axle 13 and a sufficient bed area between the front axle 7 and the rear axle 13 to accommodate the mower housing and suspended system 10. A conventional design mowing attachment including a housing 14 is attached to the above-referred-to bed area in the manner to be described hereinafter, the mowing attachment and housing 14 having front lower roller wheels 15 mounted on lower forward housing area 16 and rear lower wheels 17 mounted on a lower rear housing area 18 to allow the mower housing 14 to ride over turf in order to prevent scalping.

The mower housing 14 is suspended from the longitudinal chassis 11 of the vehicle by a suspending mounting system 10 to be described hereinafter. Cross-bars 19 are mounted between the two longitudinally-extending chassis rails 11 adjacent the front axle 7. Depending from cross-bars 19 is a main support deck bracket 20 and a depending bracket 21. Main support deck bracket 20 provides a pedestal to support a slewably-movable bracket 22. Bracket 22 has a hollow cylindrical portion 23 which is concentrically disposed around upstanding post 24. Bracket 22 includes two ears 25 projecting therefrom as well as an arm 26 projecting therefrom, ear 25 and arm 26 being spaced 90° apart.

The suspending mounting system 10 also includes four depending guide arms 27 secured to the chassis rails 11. Guide arms 27 are both longitudinally and laterally spaced apart. The longitudinal spacing is sufficient to accommodate and guide the mower housing 14.

The mower housing 14 includes a forward shackle 28 secured to the mid-portion of the lateral leading edge 29 of the mower housing 14 (see FIGS. 3 and 4). The shackle 28 includes an ear 30 disposed between the upper arm 31 and the lower 32 arm of the shackle 28. An upright pin 33 passes through aligned apertures in the arms 31, 32 of the shackle 28 and the ear 30 so that the ear 30 is slewably-mounted to the shackle 28.

The lower portion of arm 26 pivotally supports a two-piece telescopic guide arm by pin 34, namely an inner arm 35 and an outer arm 36. Inner arm 35 and outer arm 36 are non-rotationally-associated with one another, but inner arm 35 is slidable within outer arm 36. [There are many ways, well known to those skilled in the art to provide such non-rotational association. Non-limiting examples thereof include splined cooperation, keyed cooperation or square cross-section or other geometric cross-section cooperation of the arms. All these alternatives are encompassed by this specification.] Outer arm 36 surrounds the inner arm 35 and is pivotally-secured to ear 30 by pin 37.

The upper portion of arm 26 pivotally supports the cylinder end 38 of a first cylinder 39 by pin 38a. [While throughout this specification reference is made to "cylinders" having "fixed ends" and "rod ends", any other prime mover mechanism can be provided to have a push-pull powered operating rod. This may be done, for example, by a pneumatic cylinder, or by means of a motor, (either electric, gasoline, diesel or hydraulic), fitted with suitable mechanism, well-known to those skilled in the art, to convert rotary motion to reciprocal motion. Accordingly, when the term "cylinder" is used it is to be interpreted as including such functional equivalents thereof.] The rod end 40 of the first cylinder 39 is pivotally-secured to an upstanding ear 41 on the inner arm 35 by pin 41a. An ear 42 upstanding from the outer arm 36 is pivotally-secured to adjustable turnbuckle 43 at pin 42a, which itself is held by pin 51 to the upper edge of mower housing 14. Adjustable turnbuckle 43 is used to adjust the level of the mower housing 14 relative to the ground. This is shown in FIG. 3.

Bracket 21 supports a second cylinder 44 by its fixed end 45 through pin 45a. The rod end 46 of second cylinder 44 is pivotally-secured to ears 25 by pin 46a.

In the embodiment shown in FIG. 4, the turnbuckle 43 has been replaced by a cylinder 47. The fixed end 47a is rotationally secured by pin 33 to ear 47b upstanding from arms 36. The rod end 47c is pivotally-secured by pin 47d to the upper forward edge of mower housing 14. Cylinder 47 may be controlled by a level sensing device (not shown) which may be mounted on the mower housing 14, automatically to correct the forward and horizontal rearward level of the mower housing 14.

Figure 5:
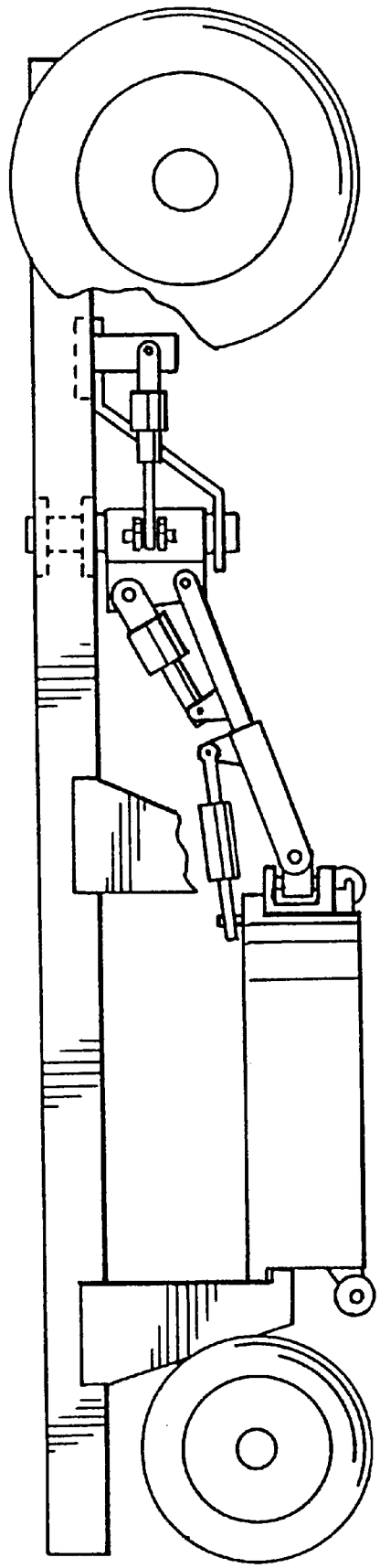
FIG. 5 is a side elevational view of a rear-mounted embodiment of the suspended mounting system of the invention described and claimed in the above-identified parent application for the mower housing.
Figure 6:
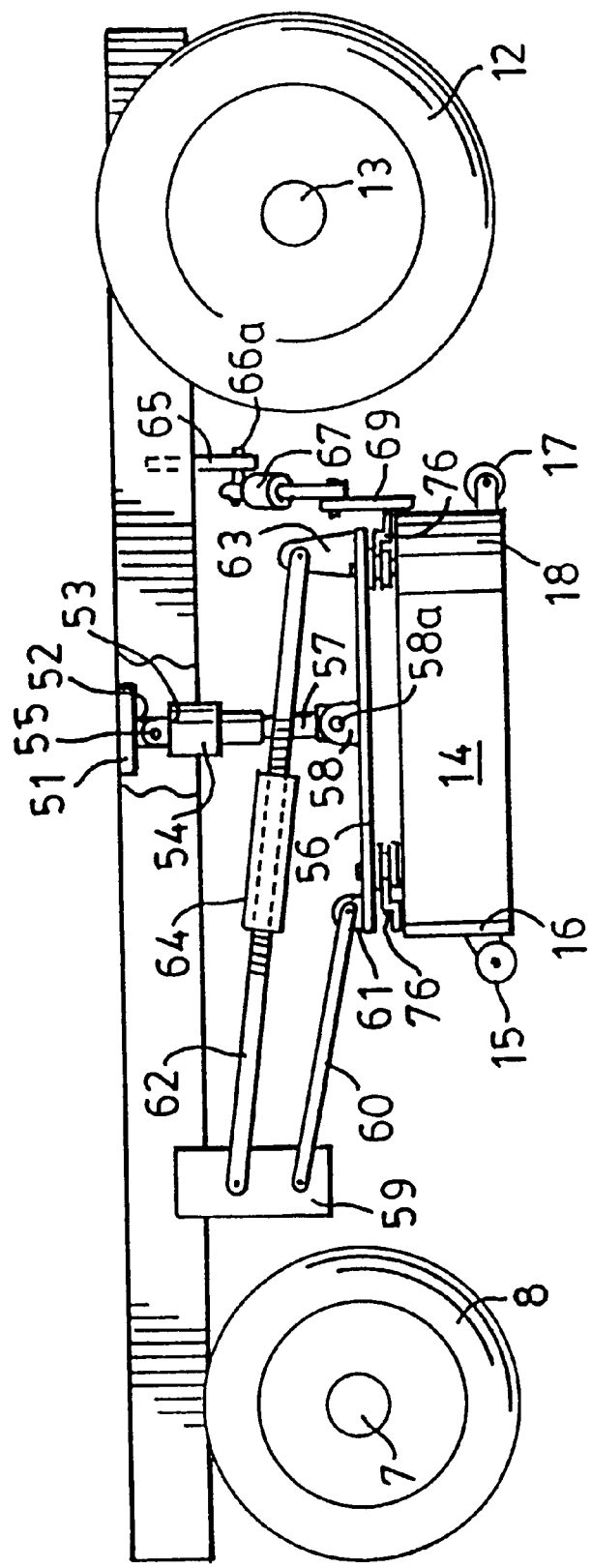
FIG. 6 is a side elevational view of another front-mounted embodiment of the suspended mounting system of the invention described and claimed in the above-identified parent application for the mower housing.
Figure 7:
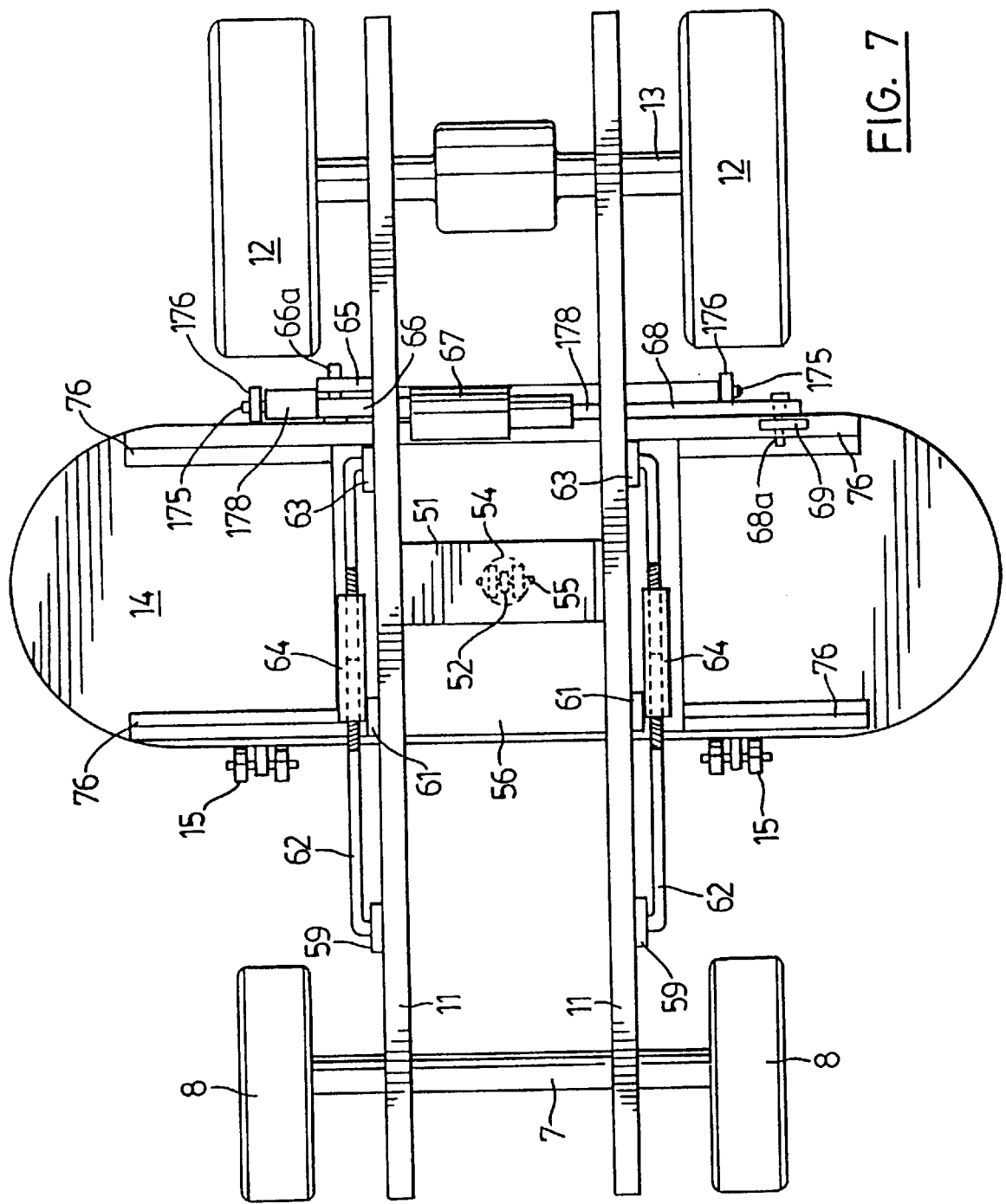
FIG. 7 is a top plan view of the embodiment shown in FIG. 6.

The embodiment shown in FIG. 5 is virtually the same as the embodiment shown in FIGS. 1–4, and so similar parts are numbered the same and no further description will be given. The major differences are in the location, i.e., adjacent the rear wheels 12 and rear axle 13 of the suspended mechanism. Additionally, as shown in FIG. 4, the turnbuckle which provided a fixed (but variable) relationship between the outer arm 36 and the mower housing 14 has been replaced by a cylinder 47.

In operation to provide vertical up-and-down motion, cylinder 39 is actuated to retract rod end 40 from the position shown in FIG. 1. This serves to raise arm 35, 36, which causes mower housing 14 to be elevated within the confines of the four guide arms 27. Actuation of the cylinder 39 to extend rod end 40 causes mower housing 14 to be lowered. Thus, the mower housing 14 can move vertically up and down, within the limits of the four guide arms 27. The mower is held rotationally stable during this vertical up-and-down motion by the telescoping tubular arms 35, 36. The prime mover power source 47 shown in FIG. 4 may be controlled by a levelling sensing device (not shown) and is operative to keep the mower housing 14 level while it is being raised and lowered.

To move the mower housing 14 laterally from left to right and vice versa, cylinder 44 is actuated to extend rod end 46. This causes bracket 22 to rotate in a counterclockwise direction. This in turn causes arms 35, 36 to rotate in a counterclockwise direction, thereby moving mower housing 14 to the top as shown in FIG. 2 (i.e. to the right) within the constraints of the four guide arms 37. Actuation of the cylinder to retract rod end 46 causes the mower housing 14 to move to the left.

(ii) Description of FIGS. 6 to 19

Referring to FIGS. 5–9, the mower attachment 14 is mounted on a conventional vehicle having a longitudinal body including longitudinally-extending rails 11, front steering wheels 8 and front axle 7, rear driving wheels 12, and rear axle 13, and a sufficient bed area between the front axle and rear axle 13 to accommodate the mower housing 14 and the suspended mechanism 50. A conventional design mower attachment including a housing 14 is attached to the above-identified bed area in the manner to be described hereinafter. In this particular case, the mower attachment and housing 14 has two pairs of wheels 15 mounted on lower forward housing area 16 and a rear lower transverse roller 17 (instead of wheels 17) mounted on lower rear housing area 18, to allow the mower housing 14 to ride over turf in order to prevent scalping.

The mower housing 14 is suspended from the longitudinal chassis 11 of the vehicle by a suspended mounting system 50. A cross-plate 51 is mounted between two longitudinally-extending chassis rails 11. Depending from cross-plate 51 is first ear bracket 52 by means of which the fixed end 53 of a first cylinder 54 is pivotally suspended by pin 55.

The mower housing 14 includes an upper plate 56 secured thereto in a manner that permits relative transverse guided substantially-frictionless movement between the plate 56 and the mower housing 14, in a manner to be described further with reference to FIGS. 8–15.

Figure 8:
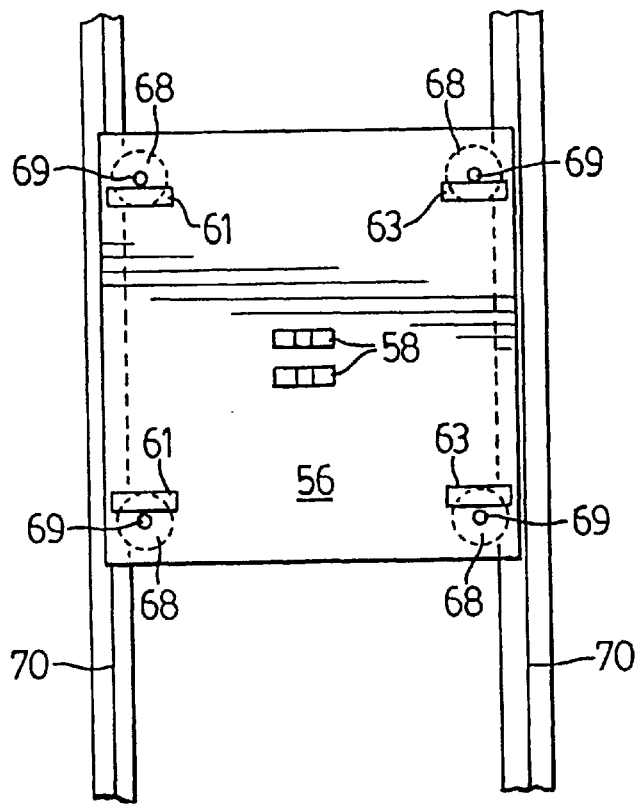
FIG. 8 is a top plan view of the upper plate of the mower housing, showing its cooperation with the longitudinal rails.

The rod end 57 of the cylinder 54 is pivotally-connected to a second clevis bracket 58 which is secured to the upper surface of plate 56 of mower housing 14 by means of pin 58a (See FIG. 8).

The suspended mounting system 50 also includes a pair of transversely-spaced-apart brackets 59, each depending from an associated chassis rail 11. The brackets 59 are connected to the plate 56 of the mower housing 14 by a parallelogram linkage. That parallelogram linkage includes short link arm 60 which is pivotally-connected at one end to one bracket 59 and which is pivotally-connected at its other end to a first upstanding ear 61 on the plate 56. The linkage also includes a long link arm 62 pivotally-connected at one end to the upper portion of bracket 59 and pivotally-connected to its other end to a second ear 63 upstanding from the plate 56. Long link arms 62 are constructed to be variable in length by virtue of the interconnecting turnbuckle 64.

This embodiment thus shows a vehicle with a power-driven mower mounted between the front and rear axles 7, 13. A simple but effective cooperative linkage arrangement consisting of parallel arms attached to frame brackets and upstanding ears on the plate. A first power means for lifting and a second power means for lateral movement are provided. If a horizontal levelling device arrangement were used, this mower housing would move in a true vertical and horizontal motion.

Actuation of the cylinder 54 to extend the rod 57 causes the mower housing 14 to move directly downwardly. Its movement is controlled to be purely vertical by the constraining action of the parallelogram linkage provided by arms 60, 62. Conversely, actuation of the cylinder 54 to retract the rod 57 causes the mower housing 14 to move directly upwardly. Again, pure vertical movement is provided by the constraining action of the parallelogram linkage, provided by arms 60, 62.

One of the chassis rails 11 is provided with a laterally-outwardly and diagonally-downwardly directed anchor bracket 65. The fixed end 66 of a second cylinder 67 is pivotally-connected to anchor bracket 65 at pin 66a. The rod end 68 of cylinder 67 is connected to upstanding ear 69 at one end of the leading edge of the mower housing 14 at pivot pin 68a.

Operation of cylinder 67 causes the mower housing 14 to move laterally with respect to the plate 56. Several mechanisms to be described hereinafter provide essentially friction-free such relative motion.

Figure 10:
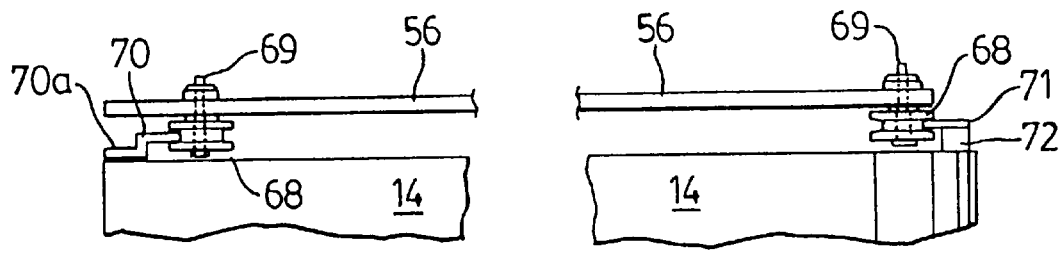
FIG. 10 is a side view of two alternative embodiments of the mechanism for allowing relative movement between the mower housing and the upper plate connected thereto, in the embodiment shown in FIG. 6.

Two such mechanisms are shown in FIG. 10. Here the lateral edges of the plate 56 adjacent the four corners are provided with pulleys 68, each mounted on pin axle 69 to be free-wheeling (see also FIG. 8). The leading and trailing edges of the mower housing 14 are fitted with transversely-extending rails to guide the pulleys 68 which, as shown in FIG. 8, are of two structures. One such rail 70, shown on the left hand side, is of stepped configuration and its base 70a is firmly secured to the upper surface of the mower housing 14 by conventional means. [These conventional "firmly securing means" are notoriously well known in the art and include such means as welding, the use of screws, nuts-and-bolts, rivets, etc. Accordingly, throughout this specification, Applicant will refer to such firmly securing means as "securing means".] Another such rail 71 is mounted on a bushing 72 and is secured to the upper surface of the mower housing 14. Identical or mixed such constructions (one of each on different lateral edges) may be provided.

Figure 9:
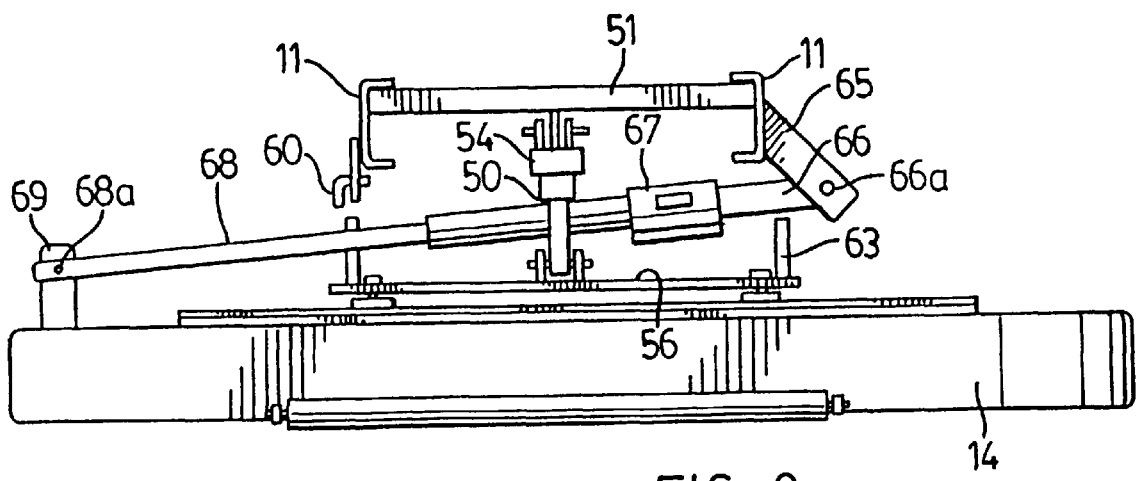
FIG. 9 is an end elevational view of the embodiment shown in FIG. 6.
Figure 11:
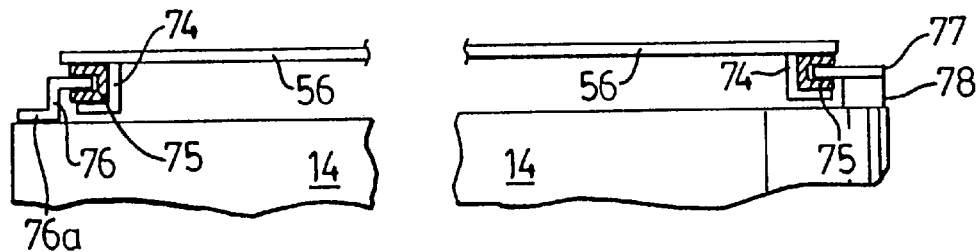
FIG. 11 is a side view of two further alternative embodiments of the mechanism for allowing relative movement between the mower housing and the upper plate connected thereto, in the embodiment shown in FIG. 6.

Two other such mechanisms are shown in FIG. 11. Here, the leading and trailing edges of the plate 56 are each provided with a U-shaped, outwardly facing bracket 74, secured by securing means. Bracket 74 embraces a U-shaped, outwardly-facing liner 75 of low friction material, one example of which is TEFLON™. The leading and trailing edges of the mower housing 14 are each fitted with transversely-extending rails to be embraced by the liners 75 which, as shown in FIG. 9, are of two structures. One such rail 76, shown on the left hand side, is of stepped configuration and its base 76a is secured to the upper surface of the mower housing 14 by securing means. Another such rail 77 is mounted on a bushing 78 and is secured to the upper surface of the mower housing 14. Identical or mixed such constructions (one of each on different lateral edges) may be provided.

Figure 12:
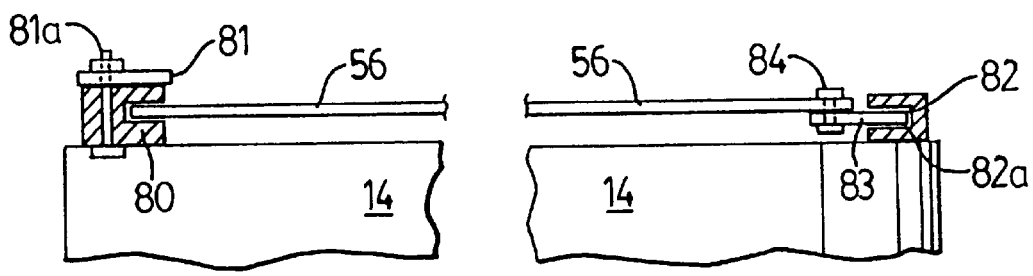
FIG. 12 is a side view of two further alternative embodiments of the mechanism for allowing relative movement between the mower housing and the upper plate connected thereto, in the embodiment shown in FIG. 6.

Yet two other such mechanisms are shown in FIG. 12. Here, the leading and trailing edges of the mower housing 14 are each fitted with transversely-extending rails which, as shown in FIG. 12, are of two structures. One such rail 80, shown on the left hand side, is of U-shaped, inwardly facing cross-section, and is secured to the upper surface of the mower housing 14 by a plate 81 and securing means 81a. The other rail 82 is of U-shaped, inwardly facing cross-section and its base 82a is secured to the upper surface of the mower housing 14 by securing means. Rails 80, 82 may be made of conventional low friction material, or may be made of metal and be lined with a conventional low friction material. The leading and trailing lateral edges of the plate 56 may each be slidably fitted within rails 80, 82 (in the manner shown on the left-hand side). Alternatively, the leading and trailing edges of plate 56 may be provided with a depending slip rail 83 which is secured to the plate 56 by securing means 84. The lateral edges of the slip rail 83 may be slidably fitted within rails 80, 82. Identical or mixed such constructions (one of each on different lateral edges), may be provided.

Figure 13:
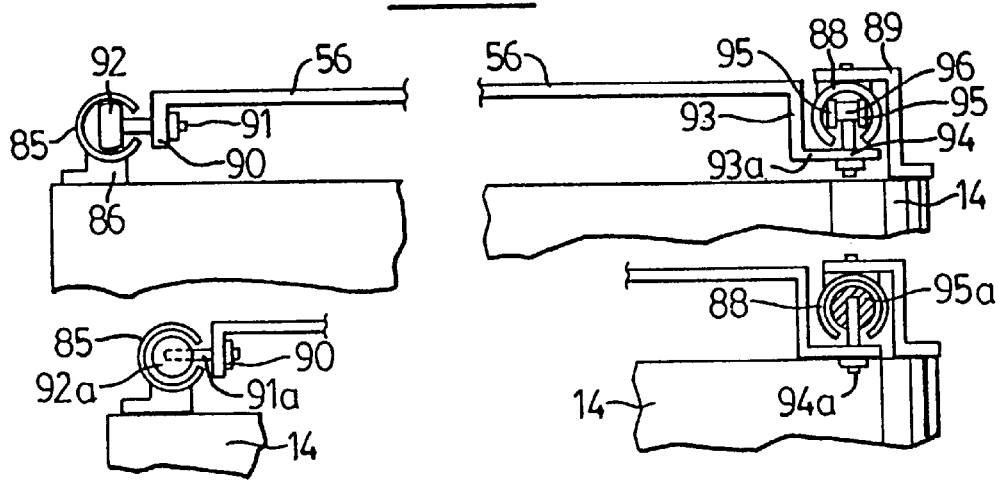
FIG. 13 is a side view of two additional alternative embodiments of the mechanism for allowing relative movement between the mower housing and the upper plate connected thereto, in the embodiment shown in FIG. 6.

Yet two other such mechanisms are shown in FIG. 13. The leading and trailing edges of the mower housing 14 are each fitted with transversely-extending guide tracks which, as shown in FIG. 13, are of two constructions. One construction shown on the left-hand side comprises a "C" rail 85, which is open inwardly, which is fixed by securing means, to a block rail 86, which in turn is secured to the upper surface of the mower housing 14. Another construction shown on the right-hand side is a "C" rail 88 open at the bottom secured, as by securing means, to an "L" rail 89 itself secured, by securing means, to the upper surface of the mower housing 14 by securing means. Each of the lateral edges of the plate 56 is also provided with rollers adapted to roll within the "C" rails. On the left-hand side, the plate 56 is provided with a depending facia 90 which secures the axle 91 of a roller 92 which rolls within "C" rail 85. On the right-hand side, the plate is provided with a stepped ledge 93, the base 93a of which supports a yoke 94 on which two spaced-apart rollers 95 are mounted on an axle 96. Rollers 95 roll within "C" rail 88. While rollers 92 and 95 are shown in this embodiment, they may be replaced by gliders 92a on the left hand side and gliders 95a on the right hand side formed of conventional low friction material and mounted on their respective axles 91a and 94a. Identical or mixed constructions (one of each), may be provided.

Figure 14:
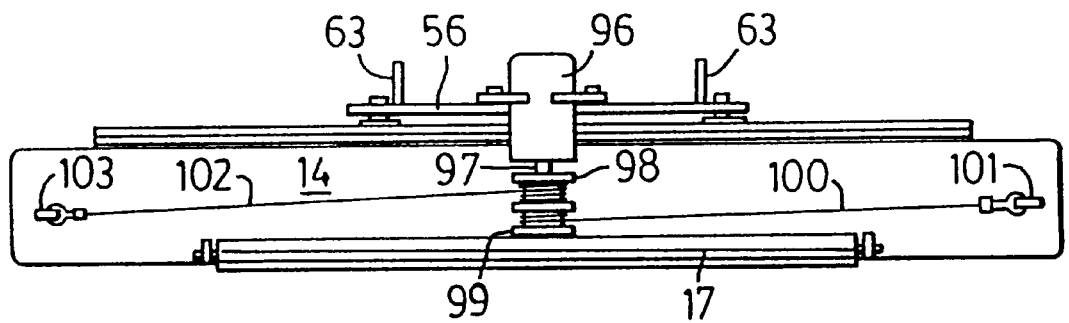
FIG. 14 is a rear elevational view of yet another embodiment of an operating mechanism for providing relative movement between the mower housing and the upper plate connected thereto, in the embodiment shown in FIG. 6.

Another means for moving mower housing 14 transversely is shown in FIG. 14. A suitable prime mover power source 96, e.g., a reversible motor, (whether it be gasoline, or diesel, or electrical, or hydraulic), is secured to the plate 56 and its drive shaft 97 depends downwardly. The drive shaft 97 is provided with two vertically spaced apart pulleys 98, 99. A cable 100 is fixed at anchor 101 at one lateral edge of the mower housing 14 and it entrains pulley 99. Another cable 102 is fixed at anchor 103 at the other lateral edge of the mower housing 14, and it entrains pulley 98.

Rotation of prime mover power source 96 in one direction pays out cable 100 and draws in cable 102, thereby moving mower housing 14 to the right. Opposite rotation of prime mover power source 96 pays out cable 102 and draws in cable 100, thereby moving mower housing 14 to the left.

Figure 15:
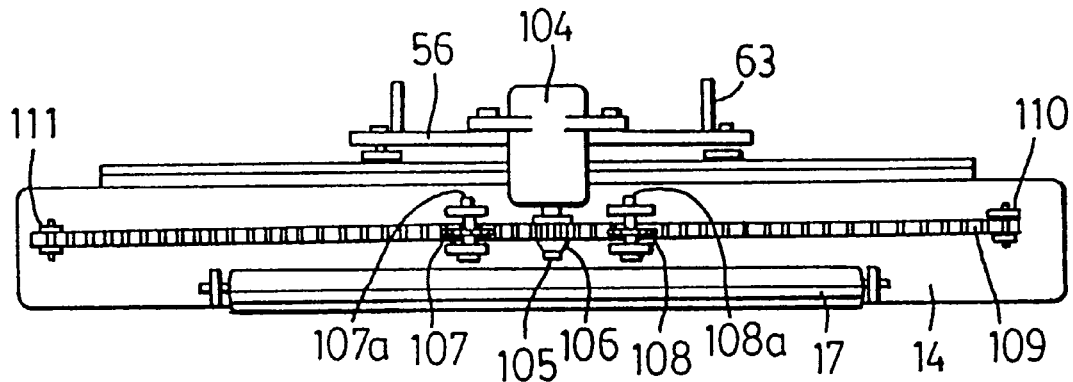
FIG. 15 is a rear elevational view of a still further embodiment of an operating mechanism for providing relative movement between the mower housing and the upper plate connected thereto, in the embodiment shown in FIG. 6.
Figure 16:
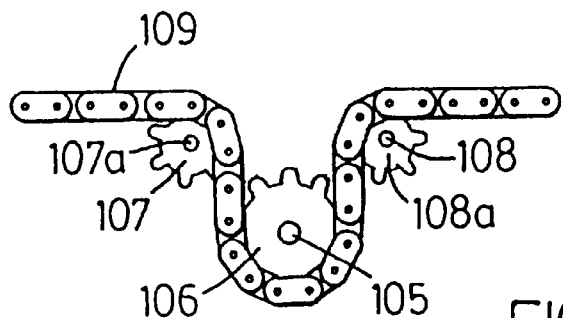
FIG. 16 is a top plan view of the sprocket, pinions and drive chain of the embodiment of FIG. 15.

Still another means for moving mower housing 14 transversely is shown in FIGS. 15 and 16. A suitable prime mover power source 104, e.g., a reversible motor, (whether it be gasoline, or diesel, or electrical or hydraulic), is secured to plate 56 with its drive shaft 105 depending downwardly and to which a drive sprocket 106 is fixed. A pair of laterally-disposed idler sprockets 107, 108 are freely rotatably mounted within the mower housing 14 on pins 107a, 108a (See FIG. 16). A chain 109 is trained around drive sprocket 106 and idler sprockets 107, 108, with one end thereof being secured at anchor 110 at one lateral edge of the mower housing 14, and with the other end thereof being secured at anchor 111 at the other lateral edge of the mower housing 14. Rotation of the power source 104 in one direction pulls the mower housing 14 in one transverse direction by means of the transverse movement of the chain 109, while rotation of the prime mover power source 104 in the other direction pulls the mower housing 14 in the other transverse direction by means of opposite transverse movement of chain 109.

Figure 17:
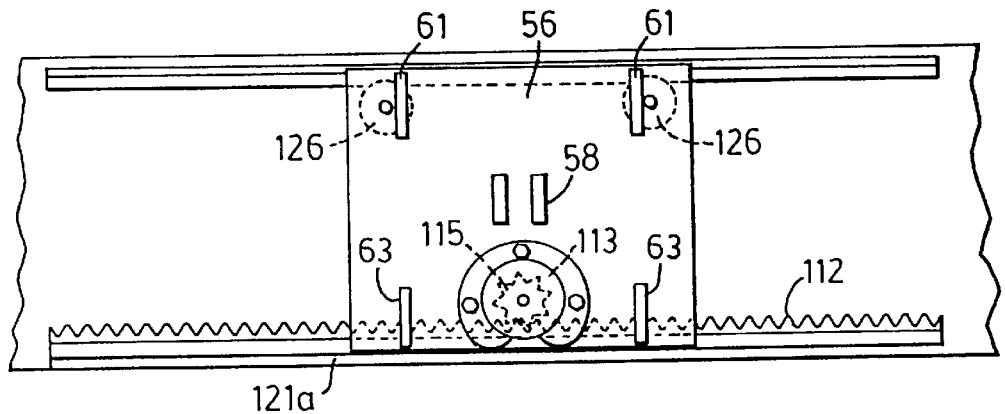
FIG. 17 is a top plan view of yet another embodiment of an operating mechanism for providing relative movement between the mower housing and the upper plate connected thereto, in the embodiment shown in FIG. 6.
Figure 18:
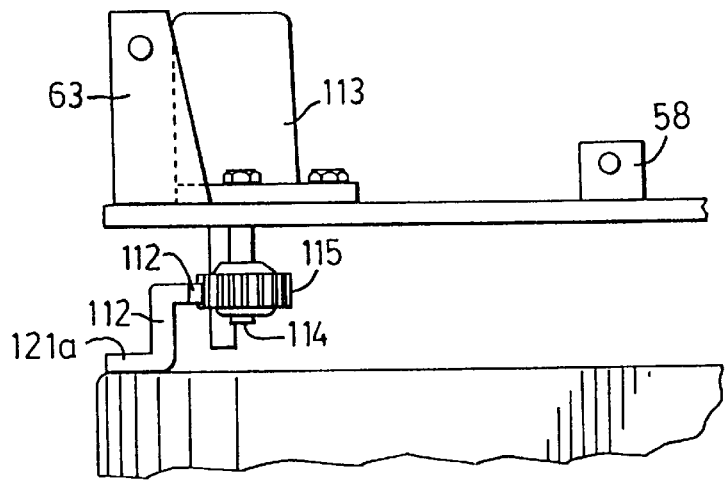
FIG. 18 is embodiments of the mechanism for allowing relative movement between the mower housing and the upper plate connected thereto, and a reversing motor in the operating mechanism shown in FIG. 17, of the embodiment shown in FIG. 6.
Figure 19:
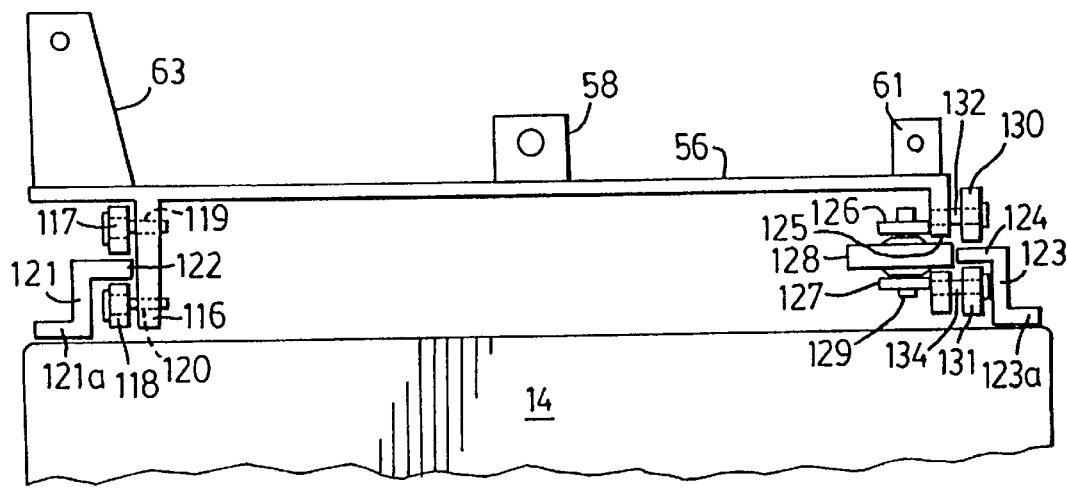
FIG. 19 is a cross-section of an embodiment with the motor removed for a clearer view, showing the mechanism for allowing relative movement between the mower housing and the upper plate connected thereto and a reversing motor, in the operating mechanism shown in FIG. 17, of the embodiment shown in FIG. 6.
Figure 20:
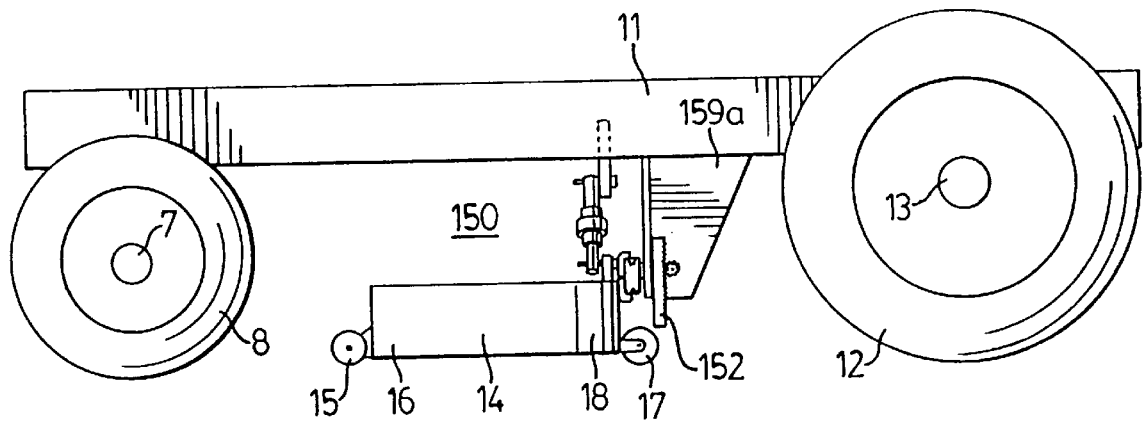
FIG. 20 is a side elevational view of another rear-mounted embodiment of the suspended mounting system of the invention described and claimed in the above-identified parent application for the mower housing showing cooperation between a prime mover and a suitable linkage to provide vertical movement.

Yet another means for moving the mower housing 14 transversely is shown in FIGS. 17, 18, and 19. As seen in FIG. 17, one lateral edge of the mower housing 14 is provided with a lateral, transversely-extending gear rack 112. The plate 56 is provided with a prime mover power source 113, e.g., a reversible motor, (whether it be gasoline, or diesel, or electrical, or hydraulic), whose drive shaft 114 depends downwardly. A gear 115 is keyed to drive shaft 114 and it meshes with gear rack 112. The lateral edge of the plate 56 which is adjacent to the gear rack 112 is provided with a pendant skirt 116 to which two vertically spaced-apart rollers 117, 118, are freely rotatably mounted being freely rotatable on their respective axles 119, 120. A stepped guide rail 121 is secured, by securing means of its base 121a to the upper surface of lower plate 56. Its longitudinally-extending upper and lower bearing surfaces 122 rollingly support rollers 117, 118. On the other lateral edge of the mower housing 14 is a second stepped rail 123 secured by its base 123a, by securing means, to the top of the mower housing 14. The lateral edge of the plate 56 is provided with a depending skirt 125, which includes upper 126 and lower 127 rails. Between upper and lower rails 126, 127 is a horizontally disposed guide roller 128 which is freely rotatably mounted on its vertical axle 129 which extends between rails 126, 127. The upper 126 and lower 127 rails include respective rollers 130, 131, which are freely rotatably mounted on their respective horizontal axles 132, 133. Rollers 130, 131 are rollingly supported on upper and lower bearing surfaces 124 of rail 123. Rotation of the prime mover power source 113 in one direction moves the gear rack in one direction to result in transverse movement of the mower housing 14 in one direction. Opposite rotation of the prime mover power source 113 causes the mower housing 14 to move transversely in the opposite direction.

(iii) Description of FIGS. 20–26

Referring to FIGS. 20–23, the mower attachment 14 is mounted on a conventional vehicle having a longitudinal body including longitudinally-extending rails 11, front steering wheels 8 and front axle 7, rear driving wheels 12 and axle 13 and a sufficient bed area between the front axle 7 and the rear axle 13 to accommodate the mower housing and the suspended mechanism 150. A conventional design mowing attachment including a housing 14 is attached to the above-defined bed area in the manner to be described hereinafter, the mowing attachment and housing 14 having a front lower wheel 15 mounted on lower forward housing area 16 and a rear lower roller 17 mounted on a lower rear housing area 18 to allow the mower housing 14 to ride over turf in order to prevent scalping.

The suspended mounting system 150 includes a pair of brackets 159, each being secured to an associated chassis rail 11 by means of securing means. Each bracket 159 is defined by a pair of spaced-apart vertical plates 159a (See FIG. 19). Drive gears 153 are keyed on transverse shaft 154 between plates 159a, gears 153 meshing with a vertical gear racks 152. Vertical gear racks 152 are provided with an axle 162, spacer sleeve 151 and washer plates 166b to which pulley 189 is freely-rotatably-mounted. Axle 162 is vertically slidable in vertical slots 161 in vertical plates 159. Transverse shaft 154 is supported on its near outer ends by bearing or bushing 174.

Figure 22:
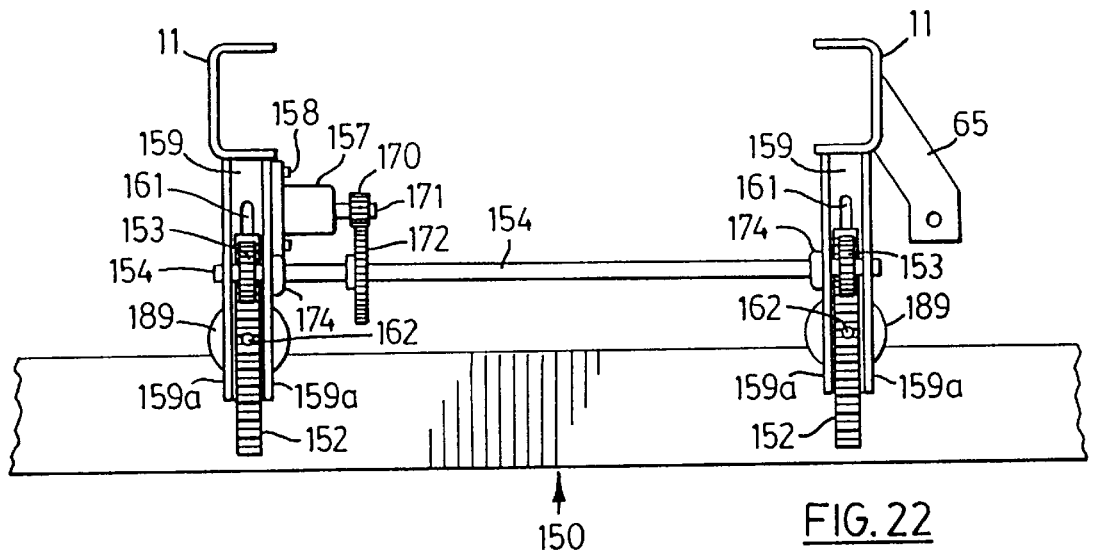
FIG. 22 is an elevational end view showing another view of the operating mechanism shown in FIG. 21 to provide vertical movement for the embodiment shown in FIG. 20.

As seen in FIG. 22, a common prime mover power source 157 is secured to one side plate 159a at securing means 158. This prime mover power source 157 includes a drive shaft 171 to which a drive gear 170 is keyed. Drive gears 170 drive common-driven gears 172 which are keyed to a cross-shaft 154. As previously described, transverse shaft 154 has drive gears 153 splined to each end thereof, for engagement with its respective gear racks 152.

Figure 21:
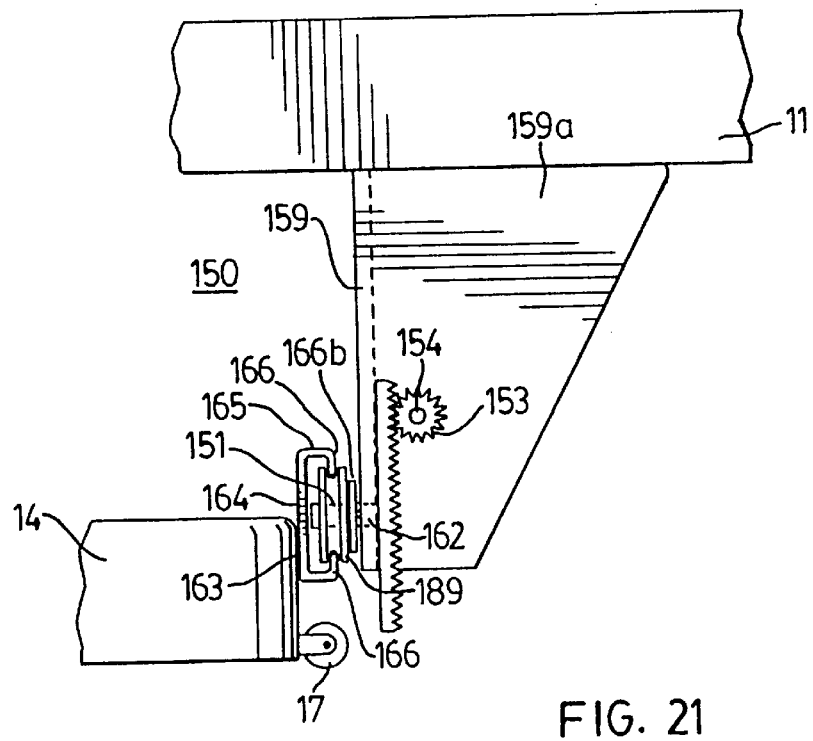
FIG. 21 is an enlarged view showing the operating mechanism to provide vertical movement, of the embodiment shown in FIG. 20.

An essentially frictionless guide system (to be described later with FIGS. 24 to 26) is provided for the relative essentially-frictionless transverse movement of the mower housing 14 with respect to the chassis rails 11. The transverse movement is facilitated by slide rail 163 provided along the trailing edge of the mower housing 14. As shown in FIG. 21, it includes a rear plate 164, upper and lower extensions 165 and upper and lower flanges 166 to provide a channel 166a therebetween.

Figure 23:
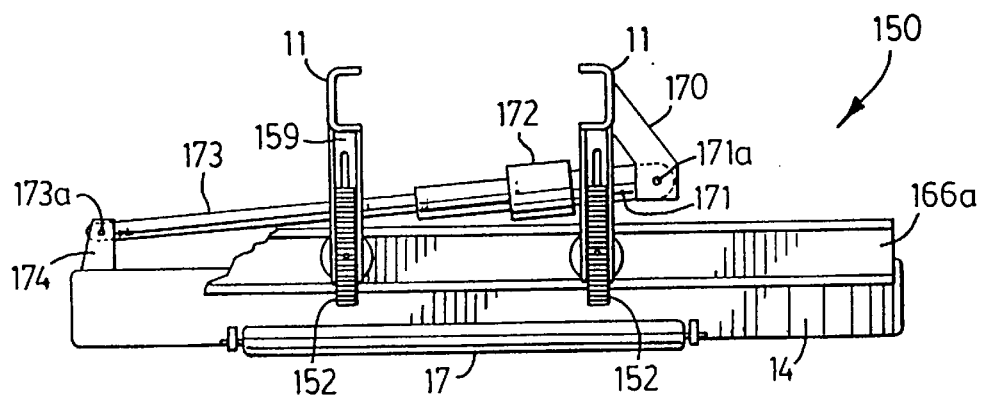
FIG. 23 is a rear elevational view of the suspended mounting system of the present invention shown in FIG. 20 for the mower housing, showing the cooperation between a prime mover and a suitable linkage to provide lateral movement.

As seen in FIG. 23, the suspended system 150 also includes a downwardly, outwardly, diagonally-directed bracket 170 which is firmly secured to one rail 11. The cylinder end 171 of a hydraulic cylinder 172 is pivotally-secured to the lower end of bracket 170 by pin 171a. The rod end 173 of cylinder 172 is secured by pin 173a to ear 174 which is upstanding from one lateral edge of mower housing 14.

Figure 24:
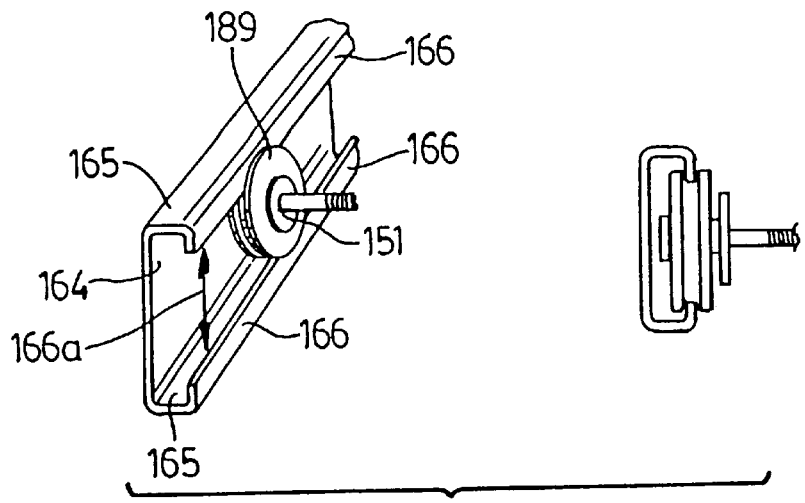
FIG. 24 is an enlarged view of one variant of an essentially-frictionless guide system for the relative transverse movement of the mower housing.
Figure 25:
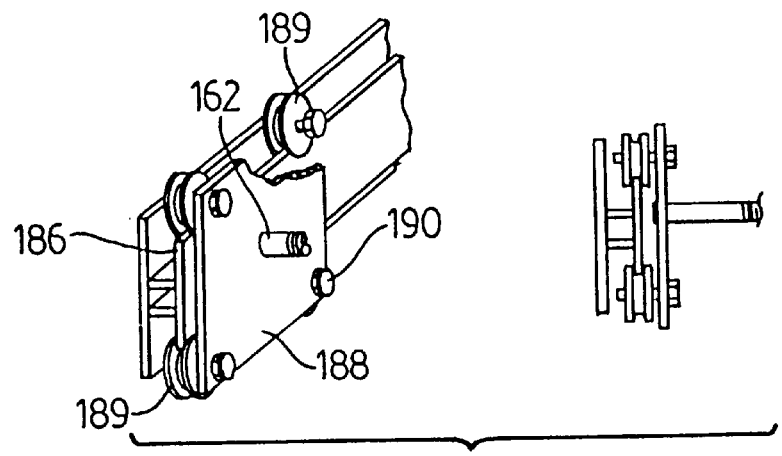
FIG. 25 is an enlarged view of another variant of an essentially frictionless guide system for the relative transverse movement of the mower housing.
Figure 26:
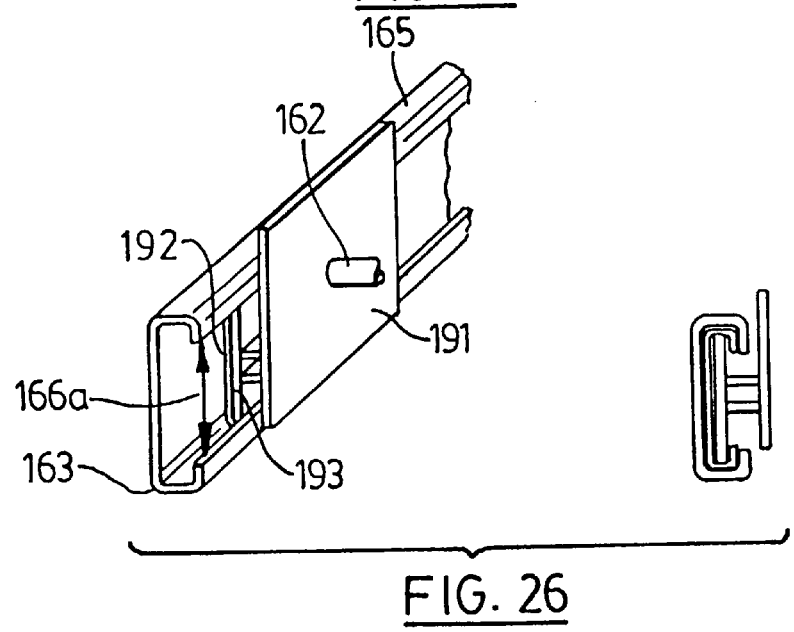
FIG. 26 is an enlarged view of yet another variant of an essentially frictionless guide system for the relative transverse movement of the mower housing.

FIGS. 24 to 26 show alternative means to provide essentially-frictionless traverse guiding of the mower housing 14.

As seen in FIG. 24, the guiding system consists of a pulley 189 which is adapted to roll on top of lower channel flange 166, and which is guided by upper channel flange 166. Pulley 189 is freely-rotatably-mounted on a bushing-spacer 151, with pin-bolt 162 inserted through pulley 189. Bushing-spacer 151, spacer-washer 166b, and gear rack 152, all adapted to slide vertically freely in slot 161.

As seen in FIG. 25, the rail system includes an "H"-shaped guide rail 186 which is secured to the mower housing 14. A short rectangular plate 188, to which pin bolt 162 is fixedly-secured is provided with four Vee-pulleys 189, each being rotatably mounted on its respective axle pin 190, i.e., one at each of the corners of the plate 188. As described with reference to FIG. 24, pin 162 is adapted to slide vertically, freely within slot 161.

As seen in FIG. 26, the guide rail 163 is secured to the mower housing 14 by securing means. An outer guide plate 191 is provided to which pin bolt 162 is fixedly secured. Guide plate 191 supports frictionless slider 192, formed e.g., of TEFLON™ by means of bar 193. Slider 192 is adapted to slide freely transversely in channel 166a in guide rail 163. Pin bolt 162 is adapted to slide freely vertically in slot 161.

Vertical movement of mower housing 14 is provided as follows:

Actuation of the prime mover power source 157 causes the transverse shaft 154 to rotate, which in turn causes gear 153, engaged with the gear rack 152, to rotate. Rotation of sprocket 153 in a clockwise direction causes the gear rack 152, and hence the mower housing 14 to be raised. Conversely, counterclockwise rotation of the sprocket 153 causes the gear rack 152, and hence the mower housing 14 to be lowered.

To move the mower housing 14 transversely, hydraulic cylinder 172 is actuated to extend rod end 173. This cause track 163 to move to the left within the constraints of the guide systems, i.e., the roller wheels shown in FIG. 24, the rolling plate show in FIG. 25 or the slider plate shown in FIG. 26. Actuation of the cylinder 172 to retract rod end 173 causes the mower housing 14 to move to the right, again within the constraints of the guide systems.

Figure 27:
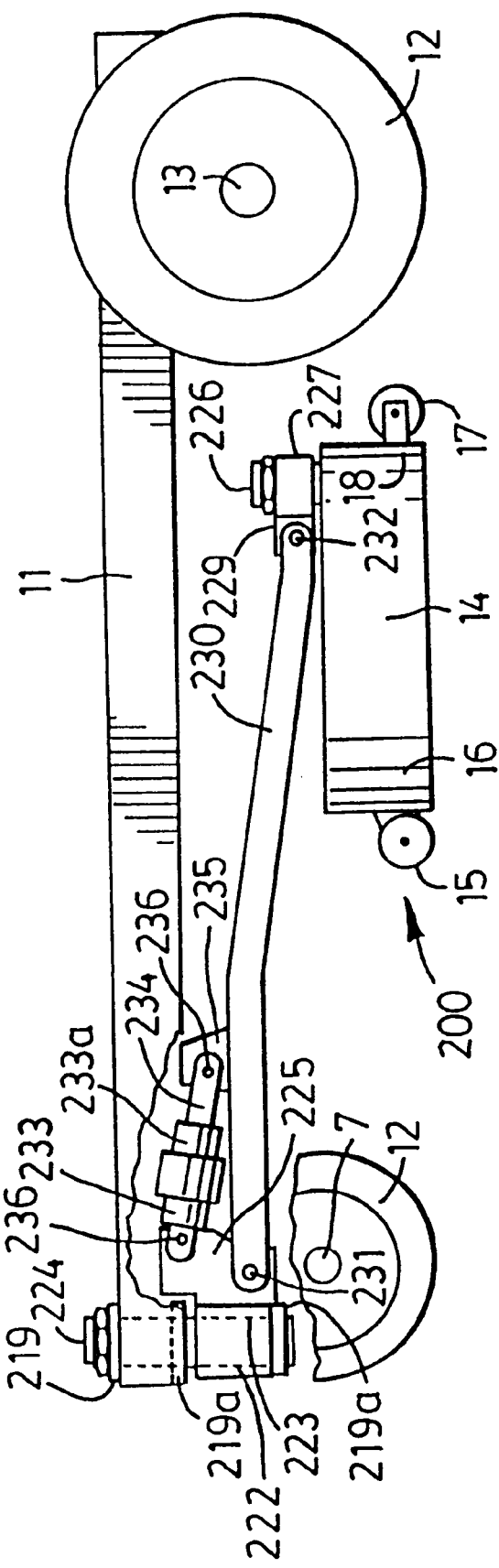
FIG. 27 is a side elevational view of yet another embodiment of the suspended system of the invention described and claimed in the above-identified parent application for the mower housing.
Figure 28:
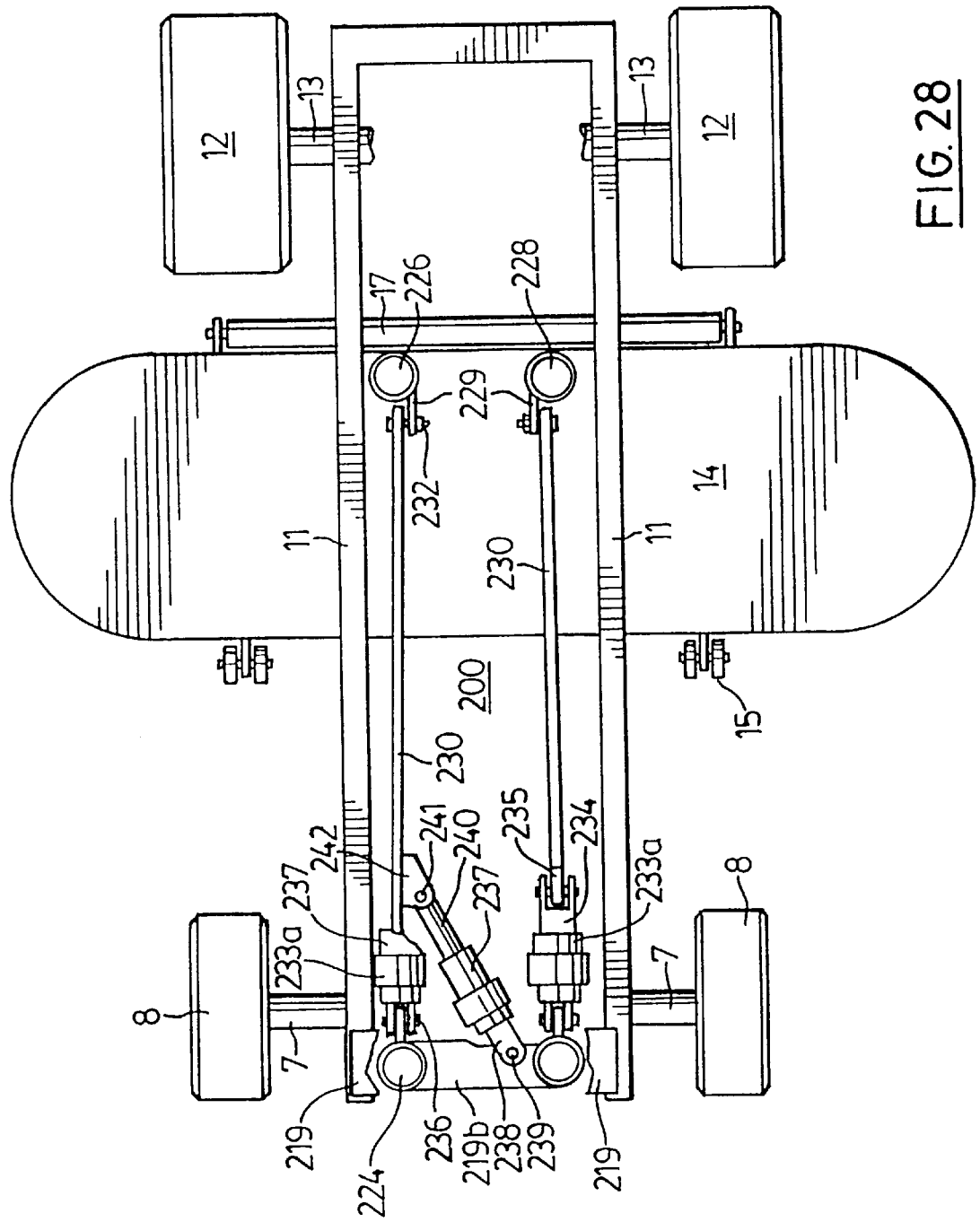
FIG. 28 is a top plan view of the embodiment of suspended system shown in FIG. 27.
Figure 29:
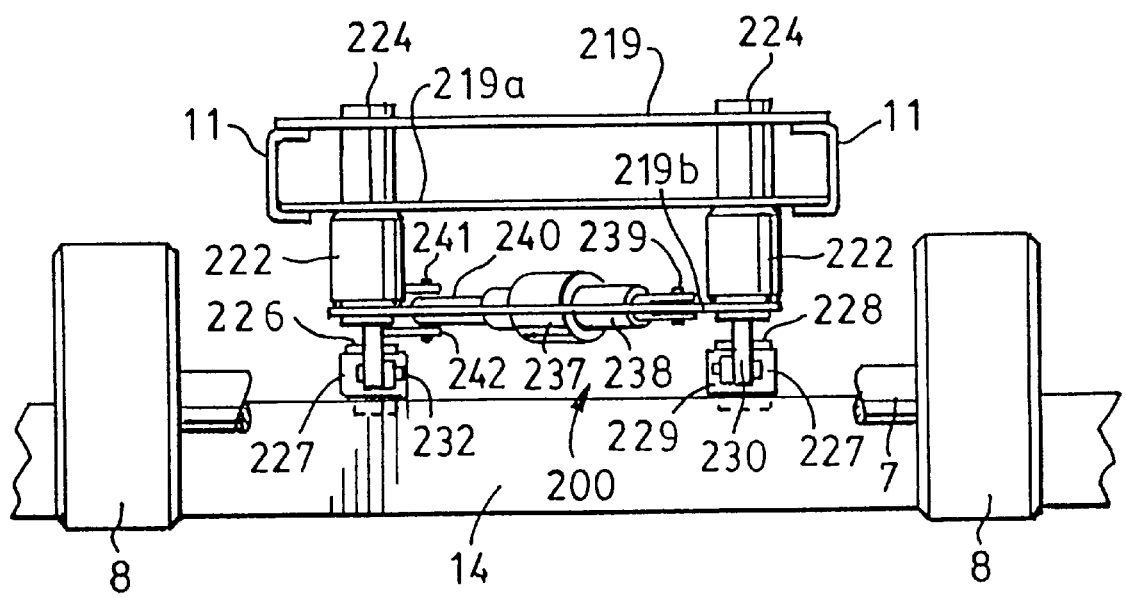
FIG. 29 is an enlarged front elevational view of the suspended system shown in FIG. 27.

(iv) Description of FIGS. 27 to 29

Referring to FIGS. 27, 28, and 29 the mower attachment 14 is mounted on a conventional vehicle having a longitudinal body including longitudinally-extending rails 11 front steering wheels 8 and front axle 7, rear driving wheels 12 and rear axle 13 and a sufficient bed area between the front axle 7 and the rear axle 13, to accommodate mower housing and suspended mechanism 200. A conventional design mowing attachment including a housing 14 is attached to the above-described bed area in the manner to be described hereinafter, the mowing attachment and housing 14 having front lower wheels 15 mounted on lower forward housing area 16 and a rear lower roller 17 mounted on a lower rear housing area 18 to allow the mower housing 14 to ride over turf in order to prevent scalping.

The mower housing 14 is suspended from the longitudinal chassis 11 of the vehicle by a suspended mounting system 200. Two cross-bars 219 and 219a are mounted between two longitudinally-extending chassis rails 11. Depending from main support posts 224. Support posts 224 support a pair of slewably-rotatably brackets 222, each of which has a hollow cylindrical portion 223 which is concentrically disposed around its respective upright post 224. Each bracket 222 includes an ear 225 projecting therefrom.

The mower housing 14 includes two rearward, transversely spaced-apart posts 226 at the rear edge and medial region of the mower housing 14. Each post 226 is provided with a bracket 227, concentrically disposed therearound a central, vertical, hollow cylindrical post 226. Each bracket 227 includes a projecting ear 229.

The lower portion of ear 225 pivotally supports an associated one of a pair of laterally spaced-apart, longitudinally-extending control arms 230 by pins 231. The other end of each of the control arms 230 is pivotally attached to its associated ear 229 by means of pins 232. The upper portion of ear 225 pivotally supports the cylinder ends 233 of each of a first pair of cylinders 233a at pins 236. The rod ends 234 of each of the first pair of cylinders 233a are pivotally-secured to upstanding ears 235 on the two control arms 230 by means of pins 236. A second cylinder 237 is pivotally-secured by its fixed end 238 of the cross-bar 219b by means of pin 239 (see FIG. 29). The rod end 240 is pivotally-secured at pin 241 to an ear 242 on one of the control arms 230. Thus, cylinder 237 is diagonally disposed with its fixed end adjacent one control arm 230 and with its rod end 240 adjacent the other control arm 230.

In operation, to provide vertical up-and-down motion, cylinders 233a are actuated to retract rod ends 234. This serves to raise central arms 230, which causes mower housing 14 to be elevated. Actuation of the cylinders 233a to extend rod ends 234 causes mower housing 14 to be lowered. The slight arc motion with horizontal movement could be kept at a minimum.

To provide transverse movement, cylinder 237 is actuated to extend rod end 240. This causes mower housing to steer (slightly) to the right. Reverse actuation to retract rod end 240 causes the mower housing 14 to steer to the left. No levelling device would be required in this arrangement.

Figure 30:
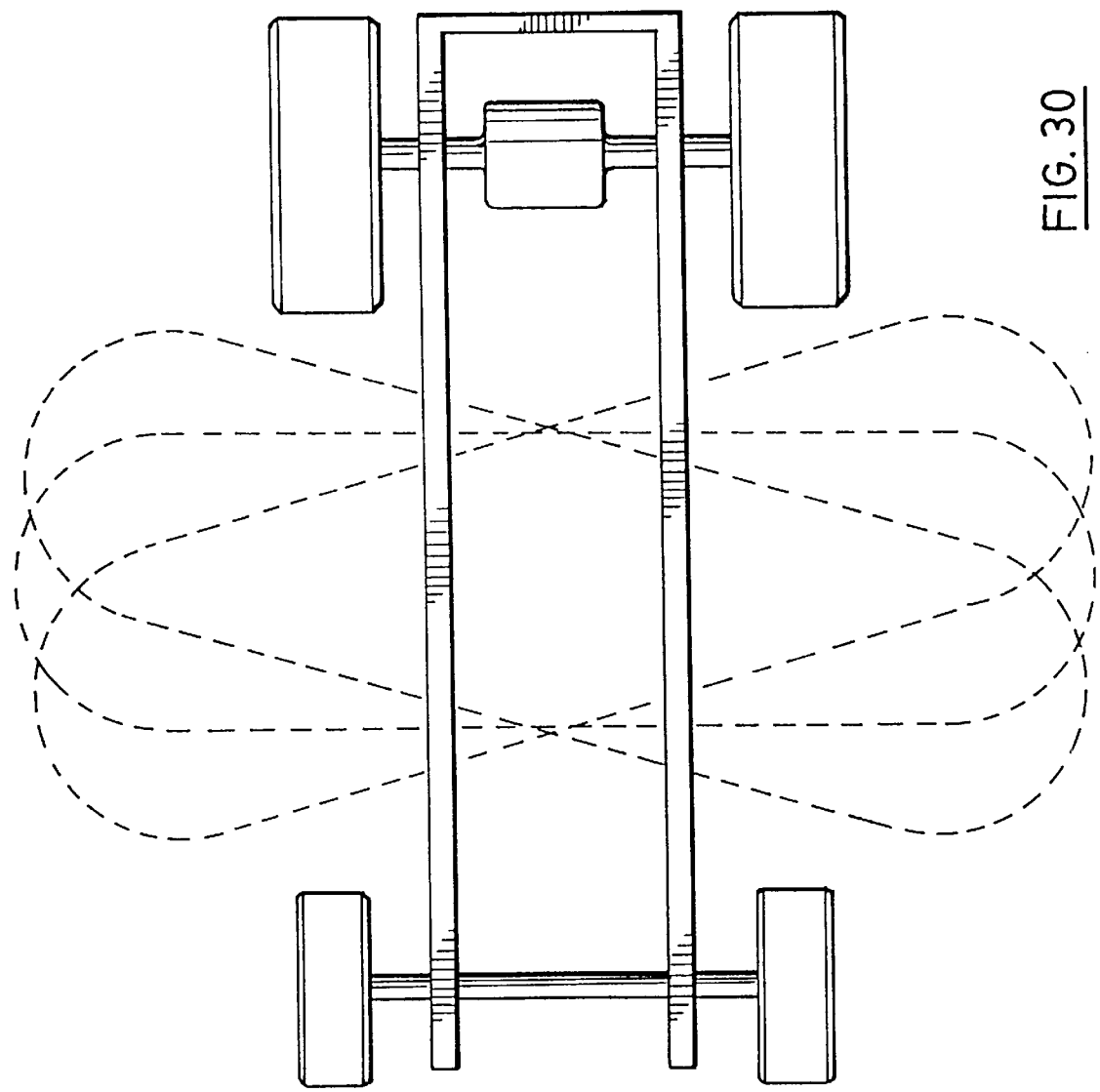
FIG. 30 is a schematic top plan view of the mower housing of the invention described and claimed in the above-identified parent application showing its orientation with respect to the longitudinal rails.

(v) Description of FIG. 30

FIG. 30 is a top view of a vehicle with a mower housing 14, mounted below the vehicle between the front axle 7 and rear axle 13. This mower is mounted so that the mower housing is fixed at a 70° to 90° angle to the frame rails of the supporting vehicle. The forward leading edge can be to the left or right of the vehicle.

This unique mower mounting can easily be achieved by using any one of the linkages and prime movers disclosed hereinbefore with respect to FIGS. 1, 5, 6, 20, and 27. By simply repositioning the guide arms 27 (FIGS. 1, 5), the descending brackets 59 (FIG. 6), the descending brackets 159 (FIG. 20), and the descending shaft 224 (FIG. 27), such mounting can be readily achieved by a person skilled in the art.

Some of the features of the mower mounting angle, as it relates to the vehicle as shown in FIG. 29 are: it allows the operator to use a wider and narrower cutting mower and still give the operator greater manoeuvrability when passing between narrow objections, parking the machine in a building, manoeuvring around other parked vehicles, etc.

(vi) Description of FIGS. 31 to 37

Figure 31:
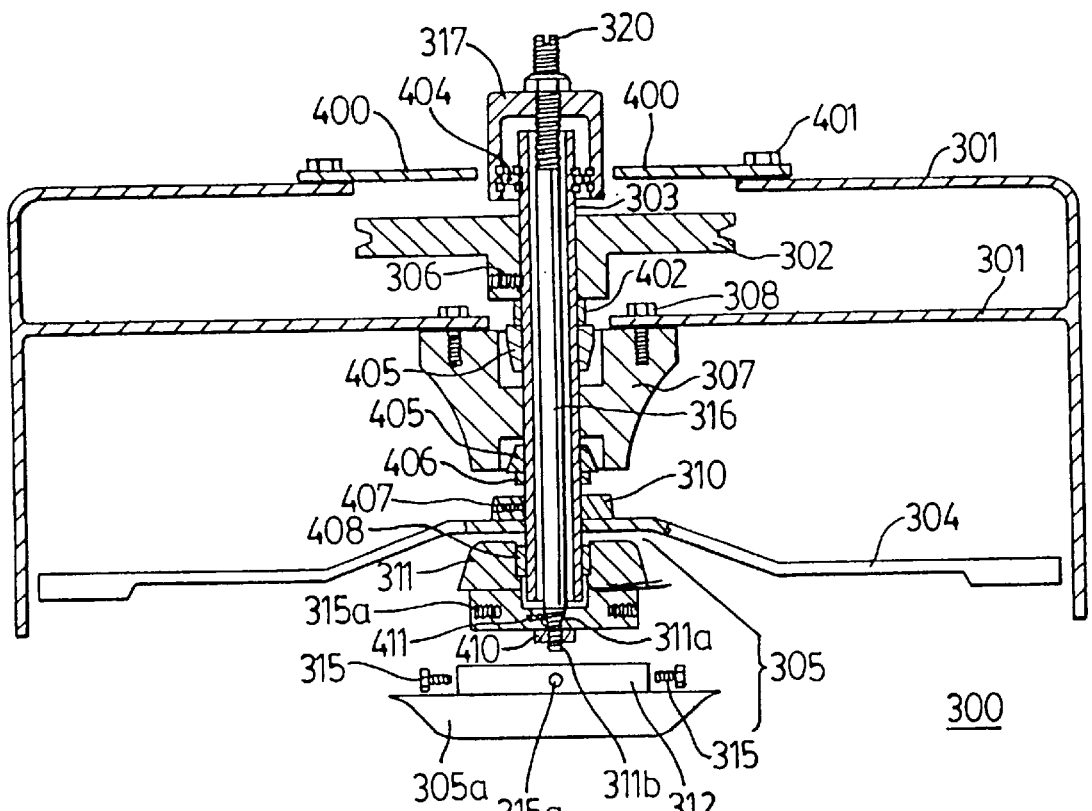
FIG. 31 is a central longitudinal cross-sectional view of a multi-bladed power mower assembly including one of several novel ground-engaging shoes shown unattached to, but closely positioned below, the main body for better viewing of the assembly of this invention.

As seen in FIGS. 30 and 31, a multi-bladed power mower assembly 300 according to the present invention is provided. The assembly includes a common housing 301 supporting a plurality of drive belt pulleys 302. These pulleys 302 are driven in common by a V-belt (not seen). A known, heavy duty, supporting hub assembly 307 is provided with two tapered roller bearings 405. The drive pulleys 302 each drive a hollow shaft 303 which causes a mower blade 304 to rotate. Hollow shaft 303 also supports a two-part, load-bearing, self-aligned body assembly 305 which can accommodate several alternative ground-engaging shoe assemblies, to be further described in FIG. 32 to 37.

The pulley 302 is keyed to a hollow drive shaft 303 by means of set screws 306. The hub 310 of the mower blade 304 is keyed to, and rotates with, shaft 303.

The self-aligned body assembly 305, including the ground-engaging shoe assembly of the present invention includes a bearing housing 311 which includes a well into which a roller bearing or bushing 408 is secured. The lower base of the hollow shaft 303 rotates within bearing or bushing 408 to enable the bearing housing 311, to remain stationary while the hollow shaft 303 rotates. The ground-engaging shoe assemblies 305a, 305b, 305c of the present invention are commonly affixed to the bearing housing 311 by a circular collar 312, and four attaching bolts 315.

As seen more clearly in FIG. 31, an adjusting bolt 316 is secured to the ground-engaging shoe bearing housing 311 as follows: The lower portion of adjusting bolt 316 has a tapered shank 311a followed by a threaded end 311b, which is received by bearing housing 311, which has a threaded hole with a tapered entry. A locking nut 410 and set screw 411 further secures adjusting bolt 316 to bearing housing 311. Adjusting bolt 316 extends upwardly within hollow shaft 303. The upper end of hollow shaft 303 is fitted with a tower housing 317, provided with threaded upper hole 318. The adjusting bolt 316 is provided with threads 319 operating within tower housing 317.

Tower housing 317 is fixed to hollow shaft 303 by four snap rings 409. The slotted head 320 of the adjusting bolt 316 with locking nut is operative to rotate the bolt 316 relative to the hollow shaft 303, in order to move the ground-engaging shoe assembly 305 of the present invention vertically. Thus, the weight of the common housing 301 is transferred through the ground-engaging shoe assembly 305 of the present invention to the upper tower housing 317 by means of adjusting bolt 316, and subsequently to the load bearing assembly 404.

Figure 32:
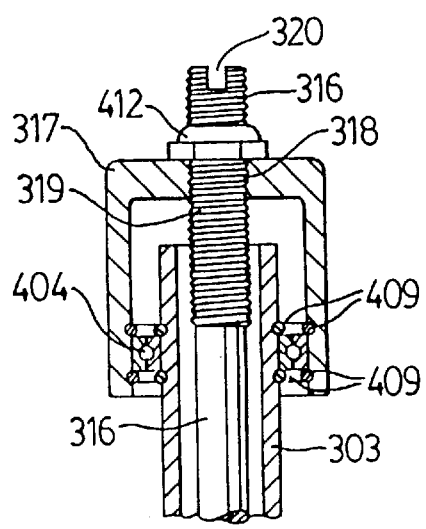
FIG. 32 is an enlarged central longitudinal cross-sectional view of the upper portions of the vertical central system for the ground-engaging shoe assembly of this invention.
Figure 33:
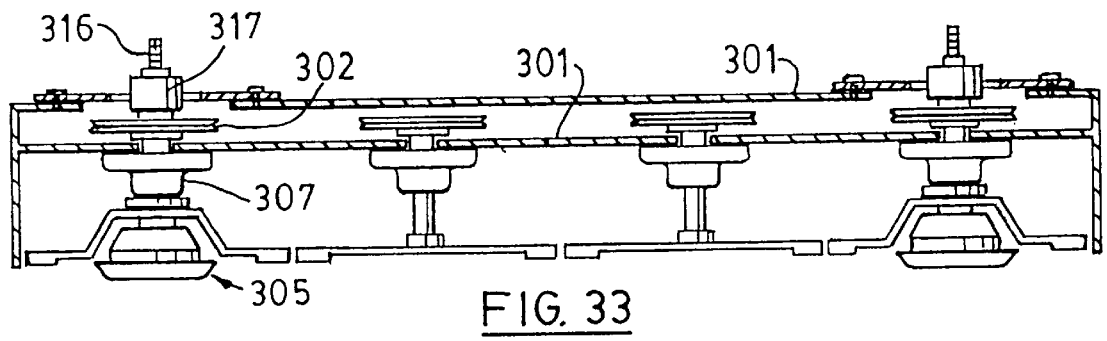
FIG. 33 is a central transverse section through a multi-bladed power mower including a plurality of adjacent power mowers and a plurality of ground-engaging shoes.

FIGS. 32 and 33 show in detail a ground-engaging shoe which is part of the ground-engaging shoe assembly 305a of the present invention shown in FIG. 30. Thus, the ground-engaging shoe 314 is shown as well as attaching collar 312, which has four holes for the attaching bolts.

Figure 34:
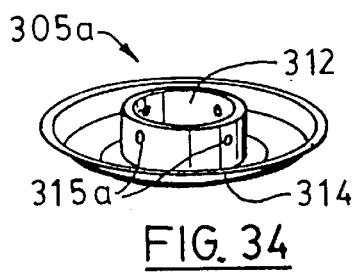
FIG. 34 is a perspective view of one lower embodiment of a ground-engaging shoe.
Figure 35:
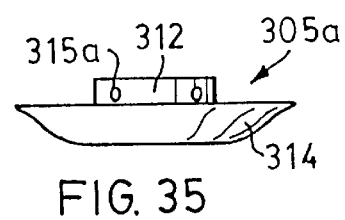
FIG. 35 is a side elevational view of the lower embodiment of ski pad shown in FIG. 34.

The ground-engaging shoe assembly 305a of the present invention of FIG. 34 is constructed of light-weight material and is shown as a dished-type ground-engaging shoe, that acts like a rolling, horizontal wheel, thus substantially reducing drag to the mower housing as it travels over the turf. In addition, this novel ground-engaging shoe assembly 305a of the present invention has an outer perimeter 314 that is turned slightly upward, thus causing the ground-engaging shoe assembly 305a of the present invention to follow the mower 14, in any direction, and also causing it to ride over any irregularities on the turf, and leaving very little ground depression. The novel ground-engaging shoe assembly of the present invention, when used, also eliminates any crushing of grass which may be caused by any outer housing wheels, rollers, or skid pads just prior to being cut by outer blades, when travelling in any direction.

Figure 36:
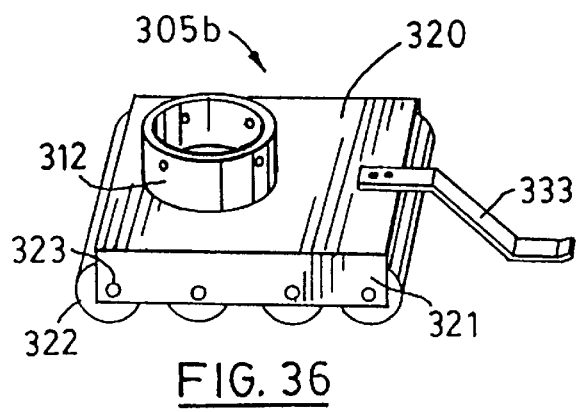
FIG. 36 is a perspective view of another embodiment of a ground-engaging shoe.
Figure 37:
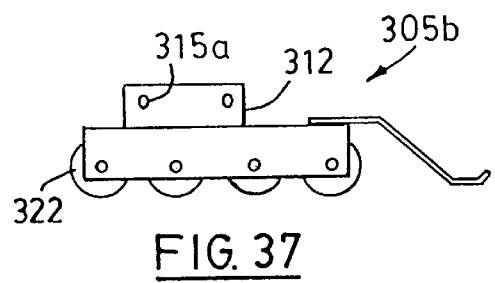
FIG. 37 is a side elevational view of the embodiment of ground-engaging shoe shown in FIG. 36.

FIGS. 36 and 37 show a further embodiment of the ground-engaging shoe assembly 305b of the present invention. This shows a rectangular plate 320, which is provided with two parallel depending skirt 321. Each skirt 321 supports a plurality (e.g., four) of freely rotatable wheels 322, which are rotatable on axles 323. A mounting collar 312 is securely fixed to the upper surface of rectangular plate 320. The ground-engaging shoe assembly 305b of the present invention of FIG. 36, which is also constructed of a light-weight material and has an off-set mounting collar 312 location which causes this ground-engaging shoe assembly 305b of the present invention to follow the mower housing similar to any caster wheel. A spring steering tab 333 on the trailing edge of plate 320 causes the ground-engaging shoe assembly 305b of the present invention to follow the mower housing in all positions. This novel design allows for a number of roller wheels or cylinders, thus reducing drag and ground depression to a minimum. A spring steering tab 333 mounted to the trailing section causes the shoe assembly of the present invention to follow the mower housing even when the ground-engaging shoe assembly of the present invention is not touching the ground.

Figure 38:
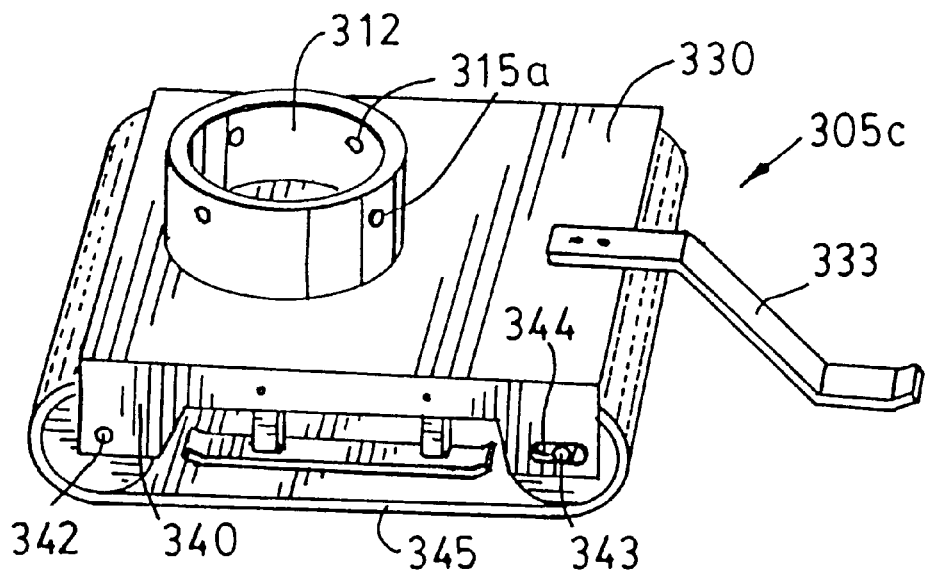
FIG. 38 is a perspective view of yet another embodiment of a ground-engaging shoe.
Figure 39:
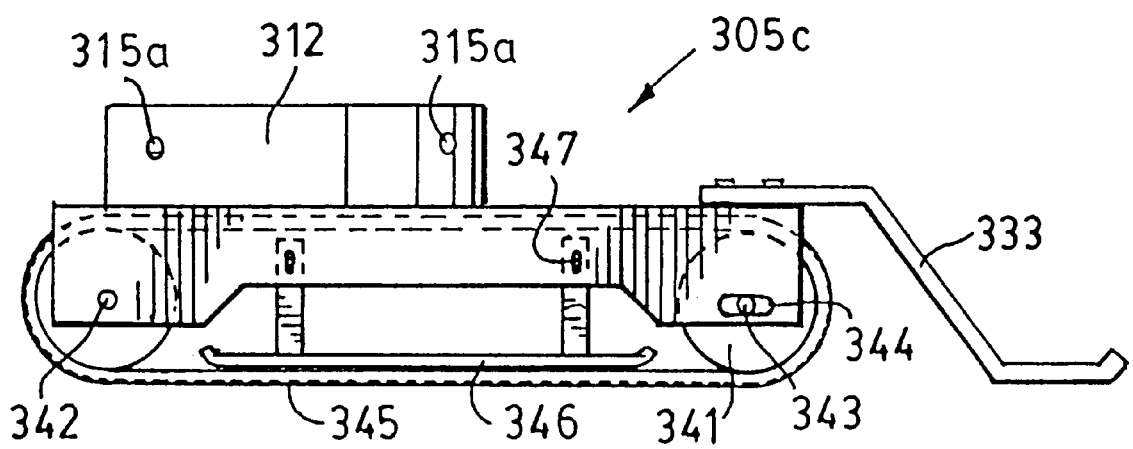
FIG. 39 is a side elevational view of the embodiment of ground-engaging shoe shown in FIG. 38.

FIGS. 38 and 39 show a further embodiment 305c of the ground-engaging shoe assembly of the present invention. This ground-engaging shoe assembly 305c of the present invention includes a rectangular support plate 330. Depending from plate 330 are two parallel skirts 340. Each skirt 340 supports two roller drums 341, which are rotatable on axles 342, and 343 respectively. Each skirt 340 contains a slotted opening 344 to allow adjustability of axle 343, which then allows belting 345 to be tightened. A mounting collar 312 securely fastens to plate 330. Each depending skirt 340 supports, by attaching bolts 347, an adjustable low friction slide runner 346 further to support belt 345. A spring tab 333, on the trailing section of 330, causes the shoe assembly of the present invention to follow the mower housing in all positions.

The shoe assembly 305c of the present invention of FIG. 38 is also constructed of a light-weight material, and also has an offset mounting location to allow good castering effect. The highly flexible, low friction belt pad material and low friction drum rollers, allow for a ground-engaging shoe assembly of the present invention that has a large square inch area of ground contact, thus allowing for an even larger weight bearing mower housing assembly and less ground depression.

This unique ground-engaging shoe assembly of the present invention when used on the outer cutting blades of a multi-bladed power mower, or on any commonly-produced mower after slight modifications, will replace the caster wheel, roller wheels, or skid plates mounted near the outer perimeter of the outside ends of a mower housing, thus preventing grass scalping. The current skid plates, caster wheels, or roller wheels, presently mounted around the perimeter of the outer ends of the mower housing, prevent many mowers from trimming closely around obstacles. This situation is more critical with the series of mowers of embodiments of the invention disclosed and claimed in the above-identified parent application, which have a laterally-movable mower housing.

With the ground-engaging shoe assembly of the present invention mounted on the outer end of the cutting blade, one can now remove any skid plates, caster wheels, roller wheels, etc. from around the outer perimeter of the outer ends of a mower housing. This new two-part load-bearing assembly houses a heavy-duty bearing or bushing, which allows the outer body to rotate slowly in either direction. In detail, the hollow drive shaft houses a long (threaded at two ends) adjusting bolt with a locking nut. Turning this adjusting bolt will, in turn, push the ground-engaging shoe assembly of the present invention up or down to accommodate different grass cutting heights. This ground-engaging shoe assembly according to the present invention will accommodate at least three different types of ground-engaging shoes of the present invention, as shown. In addition, this embodiment of the invention makes cutting height of the mower housing effectively easy and quick to adjust from the top side of the mower.

5) CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A ground-engaging shoe assembly for a mower housing for a power mower in which a mower blade is rotated on an upright shaft, said ground-engaging shoe comprising:

a hub support assembly which is secured to said mower housing of said power mower;

a bearing housing which is adapted selectively to accept different ground-engaging shoes, and to which said selected ground-engaging shoe is adapted to be quickly installed, exchanged and secured;

a ground-engaging shoe which is secured to a lower face of said bearing housing, said bearing housing including a bearing within which said hollow shaft rotates, whereby said ground-engaging shoe is stationary;

an adjusting bolt extending through said hollow shaft and secured at its lower end to said bearing housing;

an upper tower housing which is adapted to transfer loading weight through said adjusting bolt to said bearing; and wherein said adjusting bolt is vertically-adjustably-secured at its upper end with respect to said upper tower housing, whereby adjustment of said adjusting bolt provides a means for adjusting the height of said mower blade of said power mower.

2. The ground-engaging shoe assembly of claim 1, wherein said hub support assembly is mounted on the interior of said mower housing.

3. The ground-engaging shoe assembly of claim 1, wherein each or all of said ground-engaging shoe assembly or assemblies includes a central upper well to accommodate said bearing housing.

4. The ground-engaging shoe assembly of claim 1, wherein said lower surface of the ground-engaging assembly comprises a low friction surface.

5. The ground-engaging shoe assembly of claim 1, wherein said low friction surface is provided by means of a rotatable, disk-shaped wheel with a turned-up outer perimeter.

6. The ground-engaging shoe assembly of claim 1, wherein said low friction surface is provided by a rectangular frame which supports a leading roller and a trailing roller, said rollers supporting and guiding an endless, low-friction belt or track.

7. The ground-engaging shoe assembly of claim 1, wherein said low friction surface is provided by a rectangular frame having a plurality of freely-rotatable, ground-engaging wheels or rollers.

8. The ground-engaging assembly of claim 1, wherein said lower friction surface is provided with a quick connect-disconnect attachment to permit different ground-engaging shoes to be quickly installed.

9. A combination comprising:

(a) a multi-bladed power mower comprising a plurality of adjacent power mowers; and (b) a plurality of ground-engaging shoe assemblies, each said ground-engaging shoe assembly comprising a ground-engaging shoe assembly as claimed in claim 1.

10. The ground-engaging shoe assembly of claim 1, wherein said adjusting bolt is secured at its lower end to said bearing housing by means of a tapered shank and a threaded lower end of said adjusting bolt which accommodates a locking-type nut.

11. The ground-engaging shoe assembly of claim 1, wherein said ground-engaging shoe includes an upper collar, and wherein said bearing housing receives said collar therein and secures said ground-engaging shoe thereto by means of bolt or screw means.

12. The ground-engaging shoe assembly of claim 1, wherein said adjusting bolt includes an upper threaded portion, and wherein said adjusting bolt is secured to said upper tower housing by means of threaded engagement with a locking-type nut, whereby the cutting height of said mower blade is adjusted by loosening said locking-type nut, and by turning said adjusting bolt by means of a slot at its upper end, thereby adjusting the height of said mower blade by raising or lowering said ground-engaging shoe.

13. The ground-engaging shoe assembly of claim 1, wherein said ground-engaging shoe included a longitudinally-extending spring steering tab which is adapted to maintain said ground-engaging shoe in its proper trailing position while said power mower blade is being lowered, or when said power mower is travelling over uneven ground.

14. The ground-engaging shoe assembly of claim 1, wherein said ground-engaging shoe includes a ground-engaging endless belt entraining a forward freely-rotatable roller and a rear freely-rotatably roller, and including a low friction lower skid plate or plates effective to reduce deflection of said endless belt while travelling over uneven ground.

* * * * *